(12) United States Patent
Kwon et al.

(10) Patent No.: US 9,658,649 B2
(45) Date of Patent: May 23, 2017

(54) DISPLAY DEVICE AND LAPTOP COMPUTER

(71) Applicant: LG ELECTRONICS INC., Seoul (KR)

(72) Inventors: Haeok Kwon, Seoul (KR); Byeongduk An, Seoul (KR); Junhyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 14/328,595

(22) Filed: Jul. 10, 2014

(65) Prior Publication Data

US 2015/0022962 A1 Jan. 22, 2015

(30) Foreign Application Priority Data

Jul. 19, 2013 (KR) .................. 10-2013-0085627

(51) Int. Cl.
*H05K 7/00* (2006.01)
*H05K 5/00* (2006.01)
*G06F 1/16* (2006.01)
*G02F 1/1333* (2006.01)

(52) U.S. Cl.
CPC ...... *G06F 1/1637* (2013.01); *G02F 1/133308* (2013.01); *G06F 1/1601* (2013.01); *G02F 2001/13332* (2013.01); *G02F 2001/133314* (2013.01)

(58) Field of Classification Search
CPC ........................................ G06F 1/16
USPC ................................... 361/679.23
See application file for complete search history.

(56) References Cited

U.S. PATENT DOCUMENTS

2009/0237586 A1* 9/2009 Han ................. G02F 1/133308
349/58
2013/0107142 A1 5/2013 Shirasaka

FOREIGN PATENT DOCUMENTS

| CN | 2789803 Y | 6/2006 |
|---|---|---|
| CN | 101206317 A | 6/2008 |
| CN | 102540520 A | 7/2012 |
| CN | 103176311 A | 6/2013 |
| EP | 2 447 762 A2 | 5/2012 |

(Continued)

OTHER PUBLICATIONS

European Search Report dated Nov. 24, 2014 issued in Application No. 14 002 259.1.

(Continued)

*Primary Examiner* — Jerry Wu
(74) *Attorney, Agent, or Firm* — KED & Associates, LLP

(57) ABSTRACT

A display device and a laptop computer including the same are disclosed. The display device includes a display module, a front cover including a front horizontal part, which covers an edge of a front surface of the display module and extends in a horizontal direction, and a front vertical part, which extends from the front horizontal part in a vertical direction and is positioned on the side of the display module, and a back cover including a back horizontal part, which is positioned in the rear of the display module and extends in the horizontal direction, and a back vertical part, which extends from the back horizontal part in the vertical direction and corresponds to the front vertical part of the front cover.

5 Claims, 38 Drawing Sheets

(56) References Cited

FOREIGN PATENT DOCUMENTS

WO    WO 2012/057550 A2    5/2012

OTHER PUBLICATIONS

Chinese Office Action dated Apr. 11, 2016 issued in Application No. 201410341554.8 (with English translation).

* cited by examiner

FIG. 5
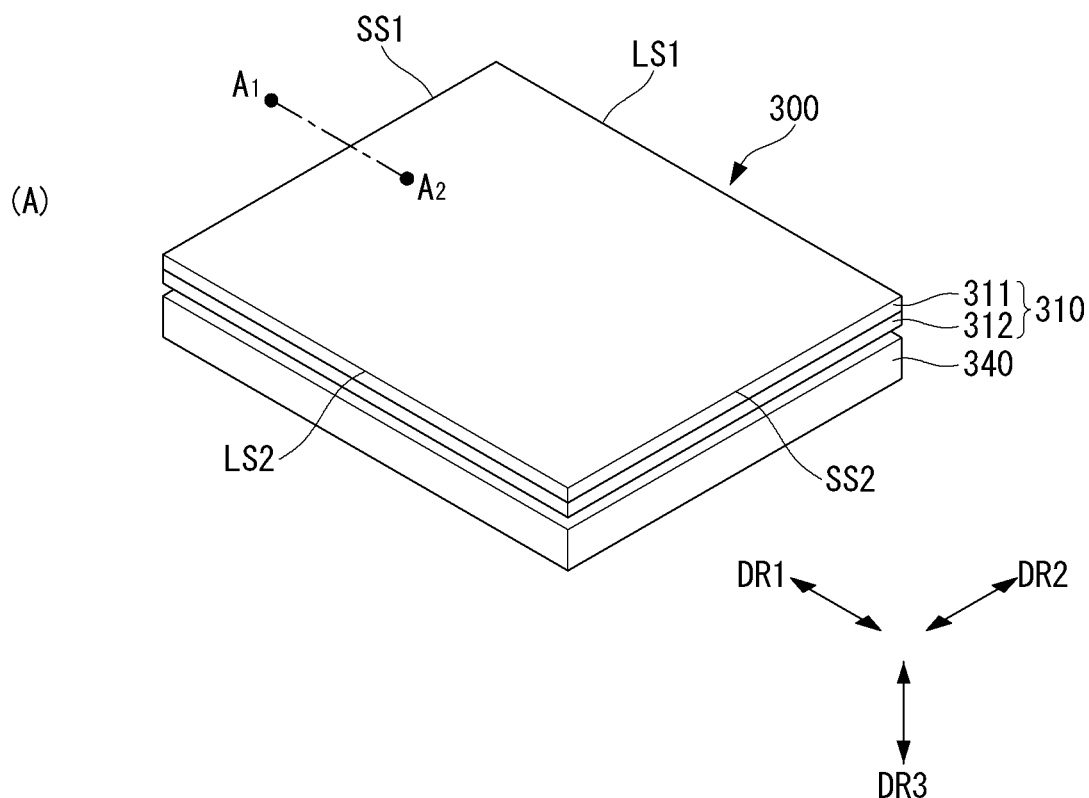
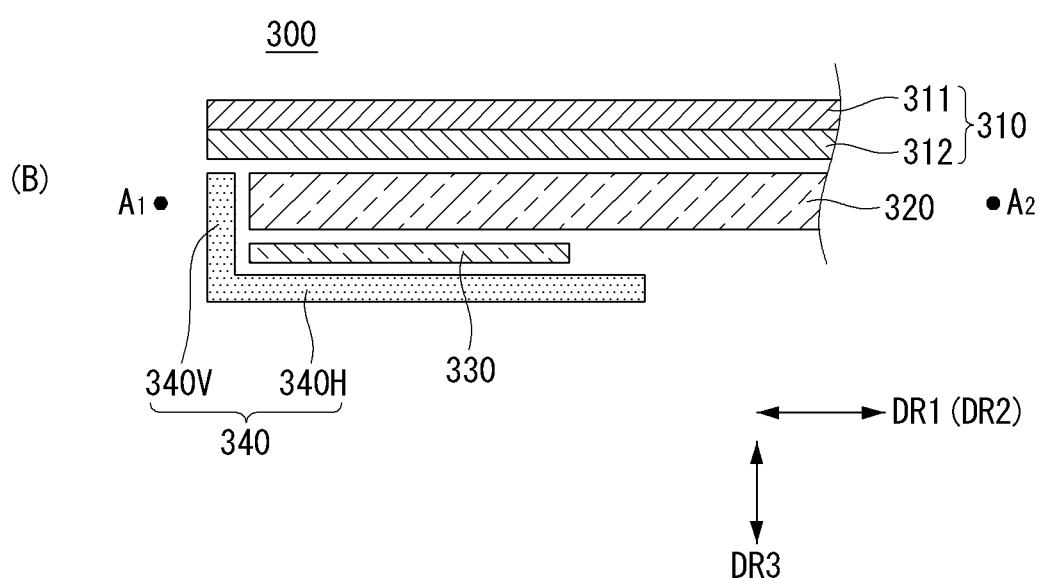

FIG. 21
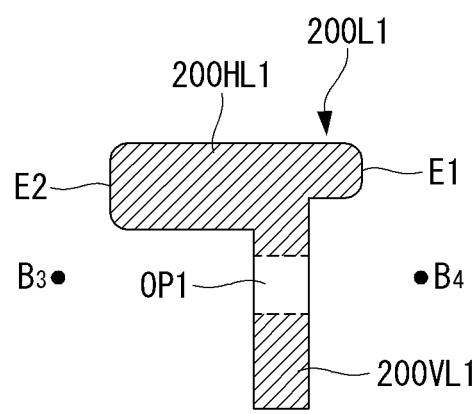
(A)
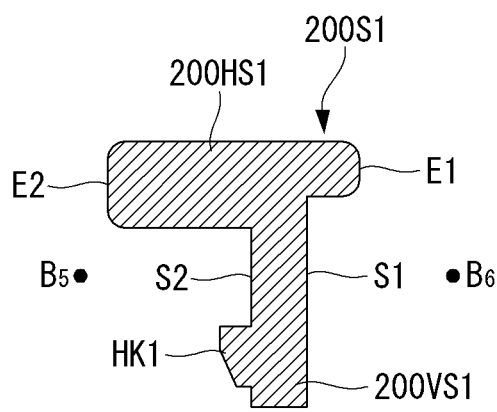
(B)
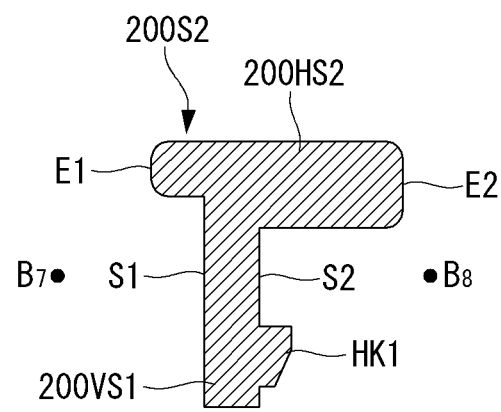
(C)

DISPLAY DEVICE AND LAPTOP COMPUTER

This application claims the benefit of Korean Patent Application No. 10-2013-0085627 filed on 19 Jul. 2013, the entire contents of which is incorporated herein by reference for all purposes as if fully set forth herein.

BACKGROUND OF THE INVENTION

Field of the Invention

Embodiments of the invention relate to a display device and a laptop computer.

Discussion of the Related Art

With the development of the information society, various demands for display devices have been increasing. Various display devices, such as a liquid crystal display (LCD), a plasma display panel (PDP), an electroluminescent display (ELD), and a vacuum fluorescent display (VFD), have been recently studied and used to meet the various demands for the display devices.

SUMMARY OF THE INVENTION

In one aspect, there is a display device including a display module, a front cover including a front horizontal part, which covers an edge of a front surface of the display module and extends in a horizontal direction, and a front vertical part, which extends from the front horizontal part in a vertical direction and is positioned on the side of the display module, and a back cover including a back horizontal part, which is positioned in the rear of the display module and extends in the horizontal direction, and a back vertical part, which extends from the back horizontal part in the vertical direction and corresponds to the front vertical part of the front cover.

A width of the front horizontal part in the horizontal direction is less than a width of the front vertical part in the vertical direction.

The front horizontal part includes a first end part positioned in the front of the front surface of the display module and a second end part positioned opposite the first end part. The second end part protrudes further than a connection portion between the front horizontal part and the front vertical part in the horizontal direction.

A first distance between the connection portion between the front horizontal part and the front vertical part and the first end part of the front horizontal part in the horizontal direction is less than a second distance between the connection portion between the front horizontal part and the front vertical part and the second end part of the front horizontal part in the horizontal direction.

The second end part overlaps the back vertical part of the back cover in the vertical direction.

A buffer having adhesion and elasticity is disposed between the front vertical part of the front cover and the display module.

The front vertical part of the front cover has an opening. The back vertical part of the back cover has a protrusion inserted into the opening.

The front vertical part of the front cover has a first hook. The back vertical part of the back cover has a second hook engaged with the first hook.

The back vertical part of the back cover includes a first back vertical part corresponding to a first long side of the back horizontal part, a second back vertical part corresponding to a first short side adjacent to the first long side of the back horizontal part, and a third back vertical part corresponding to a second short side opposite the first short side of the back horizontal part. The back cover has an opened portion on a second long side opposite the first long side of the back horizontal part in the horizontal direction.

The front cover includes a first front cover corresponding to the first long side of the back horizontal part, a second front cover corresponding to the first short side of the back horizontal part, and a third front cover corresponding to the second short side of the back horizontal part. The first front cover includes a first front horizontal part covering an edge of the front surface of the display module on a first long side of the display module and a first front vertical part corresponding to the first back vertical part. The second front cover includes a second front horizontal part covering an edge of the front surface of the display module on a first short side of the display module and a second front vertical part corresponding to the second back vertical part. The third front cover includes a third front horizontal part covering an edge of the front surface of the display module on a second short side of the display module and a third front vertical part corresponding to the third back vertical part.

The first hook is formed on each of the second front vertical part and the third front vertical part of the front cover. The second hook is formed on each of the second back vertical part and the third back vertical part of the back cover.

The display device further includes a bottom cover, which is positioned in the opened portion of the back cover and includes a portion covering the edge of the front surface of the display module.

The bottom cover includes a portion corresponding to an end of the second front cover and a portion corresponding to an end of the third front cover.

A width of the back cover in a direction parallel to the first and second short sides is greater than a width of the front cover and a width of the display module in the direction parallel to the first and second short sides. The width of the display module in the direction parallel to the first and second short sides is greater than the width of the front cover in the direction parallel to the first and second short sides.

The display module includes a display panel and a frame positioned in the rear of the display panel. The frame has a frame hole.

The frame includes a horizontal frame extending in the horizontal direction and a vertical frame extending from the horizontal frame in the vertical direction. The frame hole is formed by partially removing the horizontal frame and the vertical frame.

The front cover includes a protrusion inserted into the frame hole.

The front cover has an opening. The frame includes a frame protrusion inserted into the opening of the front cover. The back cover includes a protrusion inserted into the opening of the front cover along with the frame protrusion.

The display device further includes a mold disposed between the display panel and the frame, the mold having a hole, and a fastening means which passes through the hole of the mold and is connected to the back cover.

In another aspect, there is a laptop computer including a first body including a display device, a second body, on which a user input device is disposed, and a hinge configured to connect the first body with the second body, wherein the display device includes a display module, a front cover including a front horizontal part, which covers an edge of a front surface of the display module and extends in a horizontal direction, and a front vertical part, which extends from the front horizontal part in a vertical direction and is positioned on the side of the display module, and a back cover including a back horizontal part, which is positioned in the rear of the display module and extends in the horizontal direction, and a back vertical part, which extends from the back horizontal part in the vertical direction and corresponds to the front vertical part of the front cover.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2 to 45 illustrate a display device according to an exemplary embodiment of the invention.

DETAILED DESCRIPTION OF THE EMBODIMENTS

Figure 1:
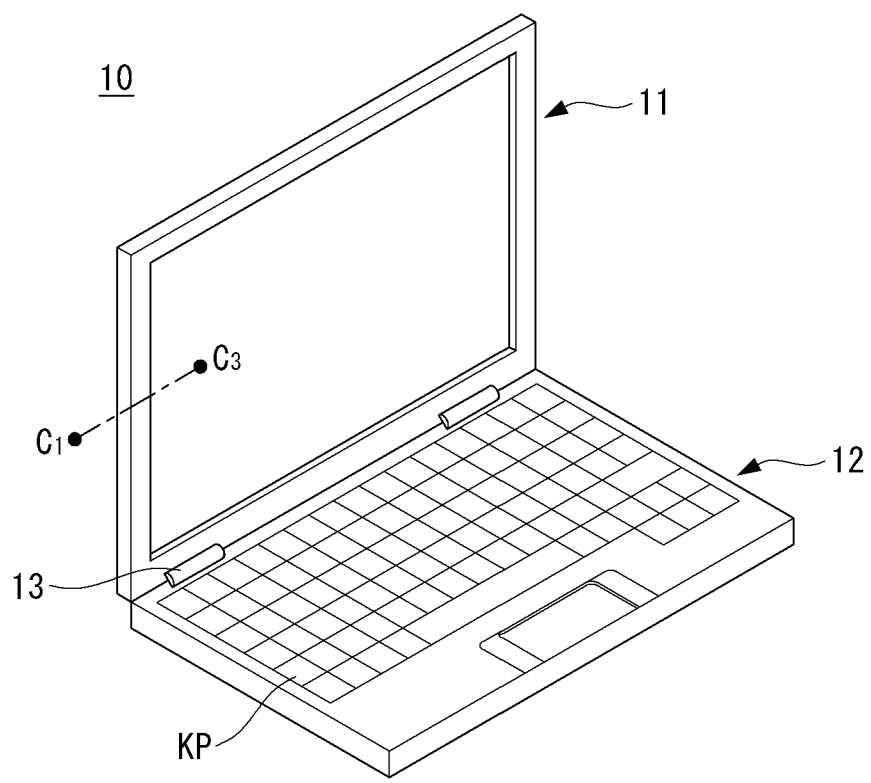
FIG. 1 schematically illustrates configuration of a laptop computer according to an exemplary embodiment of the invention.

Reference will now be made in detail embodiments of the invention examples of which are illustrated in the accompanying drawings. Since the embodiments of the invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

The following exemplary embodiments of the invention will be described using a liquid crystal display panel as an example of a display panel. Other display panels may be used. For example, a plasma display panel and an organic light emitting display panel may be used.

FIG. 1 schematically illustrates configuration of a laptop computer according to an exemplary embodiment of the invention.

As shown in FIG. 1, a laptop computer 10 according to the embodiment of the invention may include a first body 11, a second body 12, and a hinge 13 for connecting the first body 11 with the second body 12.

The hinge 13 may connect the first body 11 with the second body 12, so that they can move.

The second body 12 may include a user input device KP. The user input device KP may be, for example, a keypad used to input a predetermined command by a user.

Further, the second body 12 may include a central processing unit CPU).

The first body 11 may include a display device. Alternatively, the first body 11 itself may be a display device. The display device is described in detail below.

FIGS. 2 to 45 illustrate a display device according to an exemplary embodiment of the invention. In the following description, the descriptions of the configuration and the structure described above are omitted.

In the following description, the display device may be the first body 11 shown in FIG. 1.

In the embodiment of the invention, a first direction DR1 may be a direction parallel to long sides LS1 and LS2 of a display module 300 and/or a back cover 100, and a second direction DR2 may be a direction parallel to short sides SS1 and SS2 of the display module 300 and/or the back cover 100.

A third direction DR3 may be a direction vertical to the first direction DR1 and/or the second direction DR2.

The first direction DR1 and the second direction DR2 may be commonly called a horizontal direction.

The third direction DR3 may be called a vertical direction.

Figure 2:
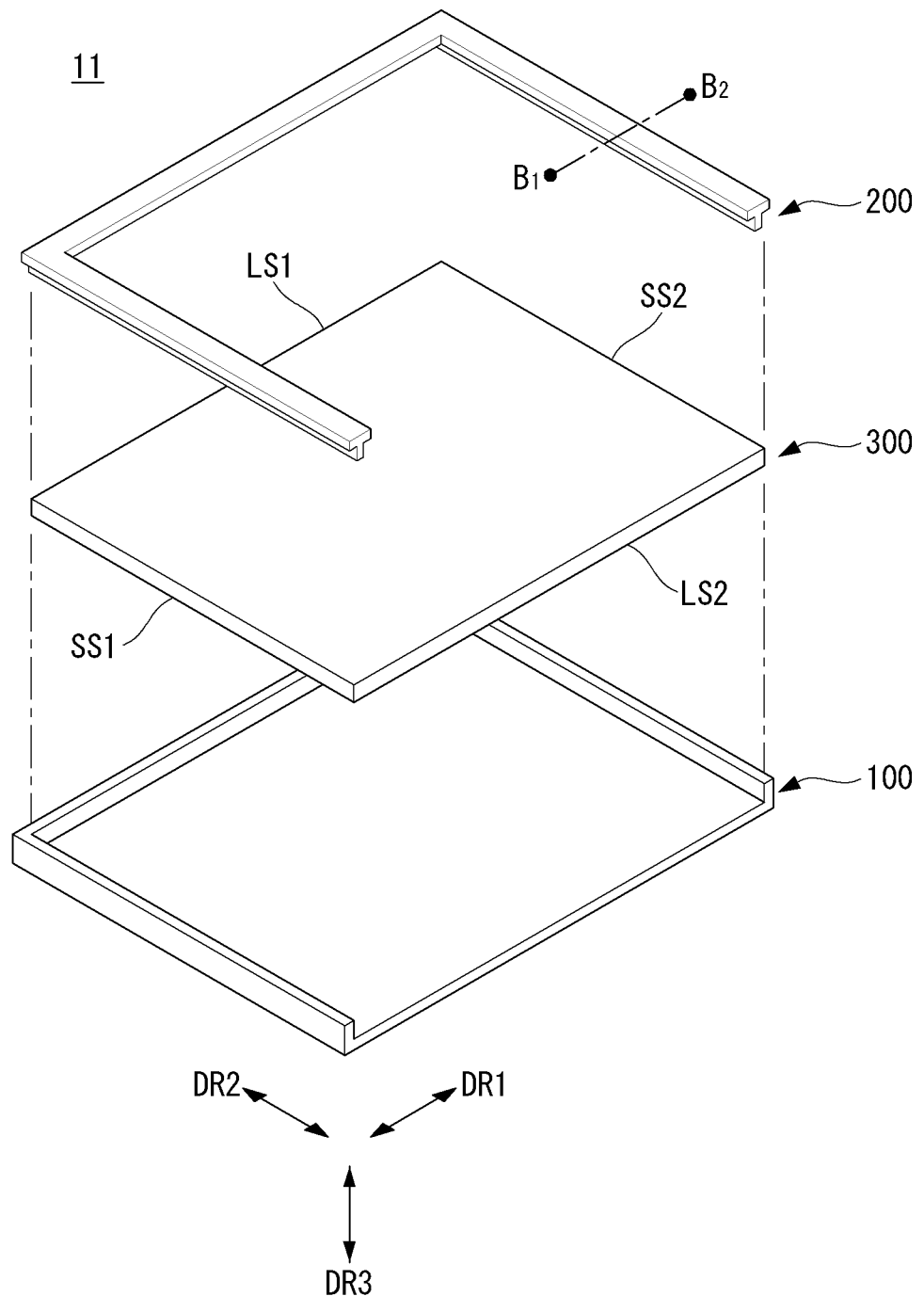

As shown in FIG. 2, the display device 11 may include the display module 300, a front cover 200, and the back cover 100.

Figure 3:
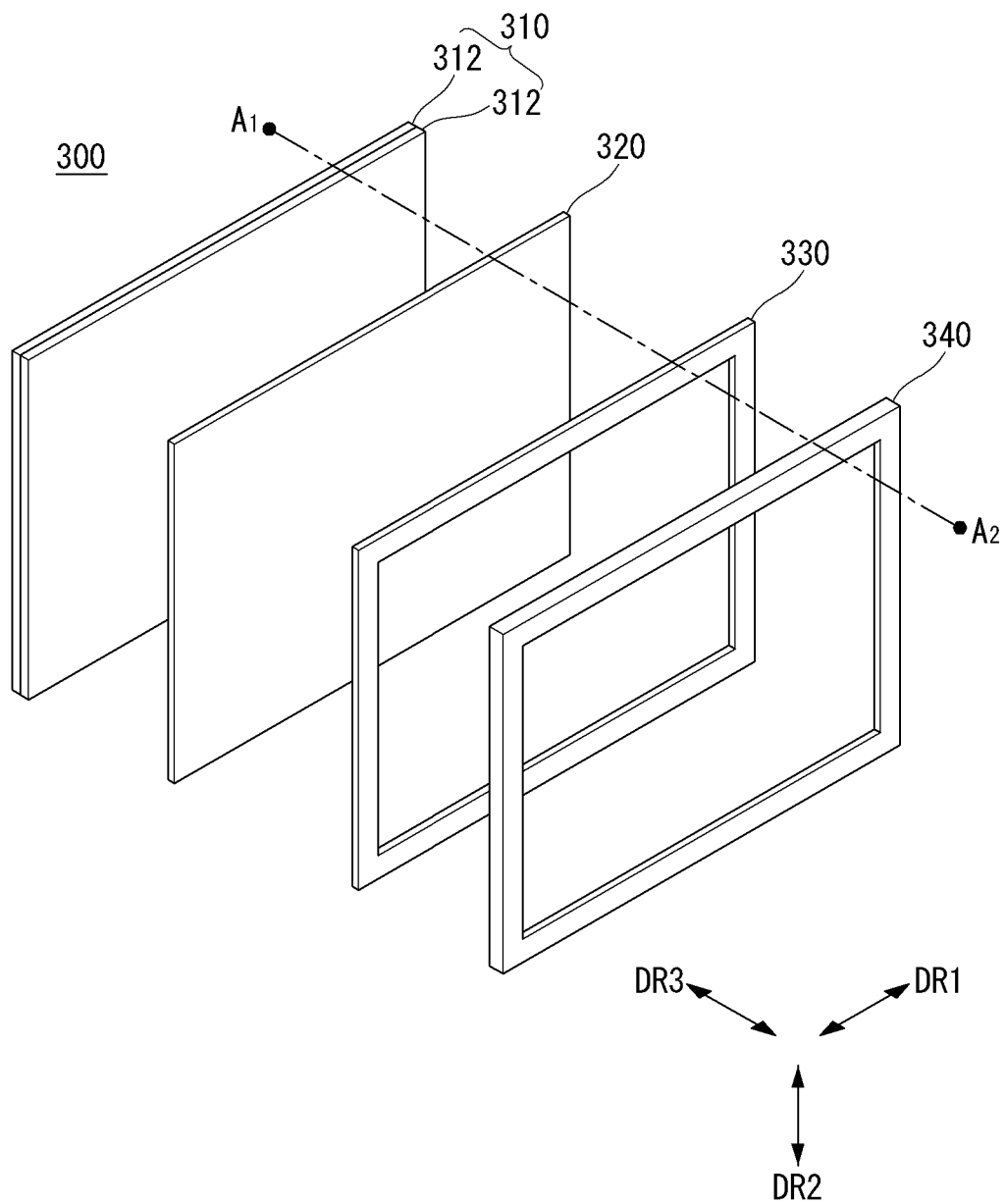

As shown in FIG. 3, the display module 300 may include a display panel 310 displaying an image and a frame 340 disposed in the rear of the display panel 310, The display panel 310 may include a front substrate 311 and a back substrate 312 which are positioned opposite each other.

The frame 340 may support the display panel 310. For this, the frame 340 may be formed of a material having sufficient rigidity, for example, a metal material.

A mold 330 may be disposed between the display panel 310 and the frame 340. The mold 330 may improve rigidity of the display module 300.

The mold 330 may be formed of plastic, so that it can be easily molded while improving the rigidity of the display module 300.

An optical layer 320 may be disposed between the display panel 310 and the mold 330. Although not shown, the optical layer 320 may include at least one of a prism sheet, a diffusion sheet, and a light guide plate.

Although not shown, the display module 300 may further include at least one light source providing light.

Figure 4:
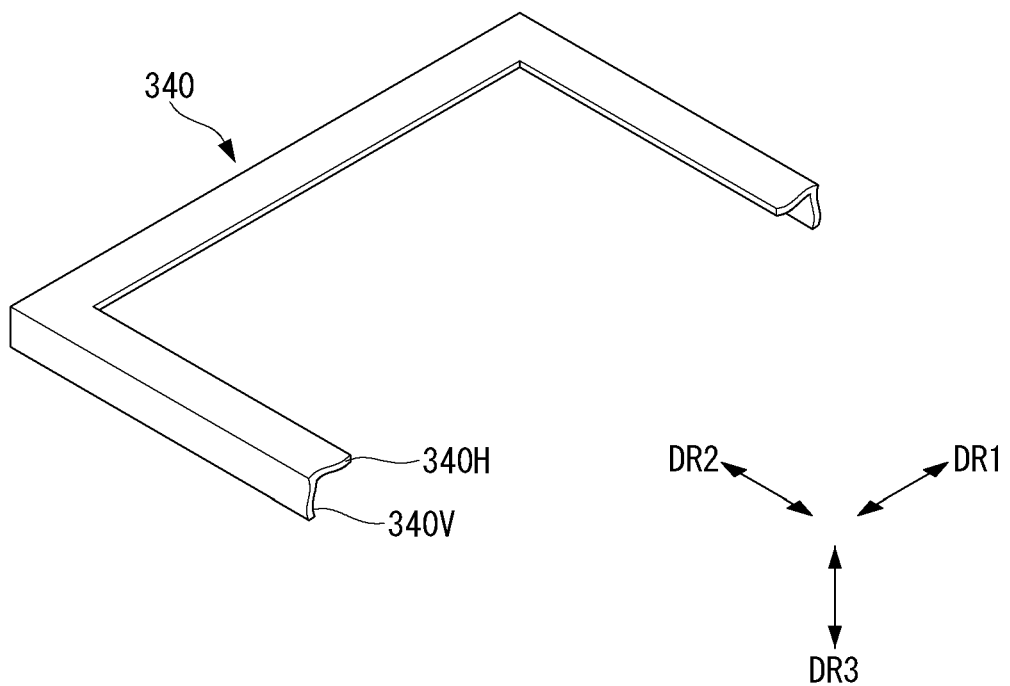

As shown in FIG. 4, the frame 340 may include a horizontal frame 340H extending in the horizontal direction (i.e., the first direction DR1 and/or the second direction DR2) and a vertical frame 340V extending from the horizontal frame 340H in the vertical direction (i.e., the third direction DR3).

The frame 340 may be positioned at an edge of the display module 300.

The display panel 310, the optical layer 320, the mold 330, and the frame 340 are coupled with one another to form the display module 300 shown in (A) of FIG. 5.

As shown in (B) of FIG. 5 showing a cross-sectional view taken along line A1-A2 of (A) of FIG. 5, the display panel 310, the optical layer 320, the mold 330, and the frame 340 may be disposed in the order named to form the display module 300.

The frame 340 may cover the side of the mold 330 the optical layer 320, the mold 330 the side of the optical layer 320.

The configuration of the display module 300 may be changed in the embodiment of the invention. For example, the optical layer 320 and/or the mold 330 may be omitted in the display module 300.

Figure 6:
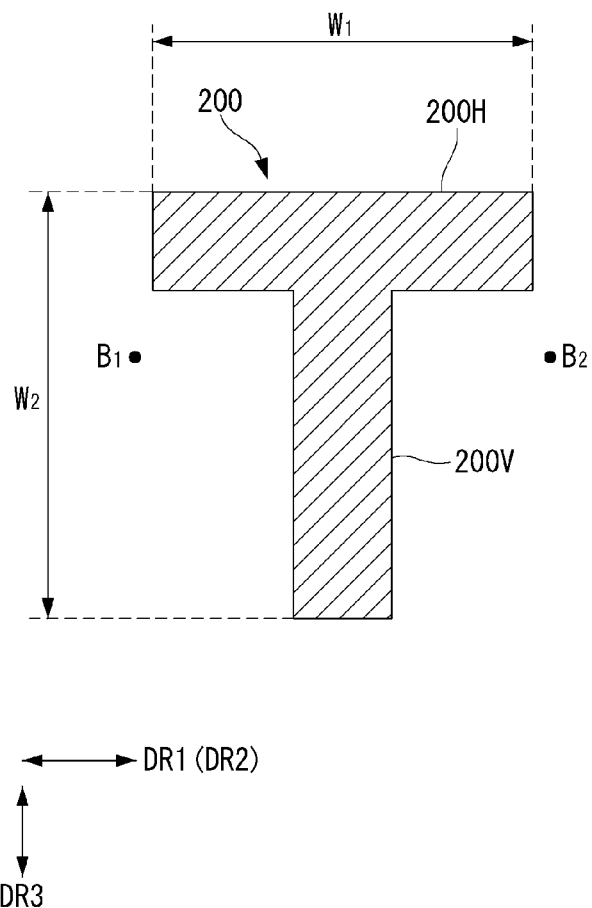

As shown in FIG. 6 showing a cross-sectional view of the front cover 200 taken along line B1-B2 of FIG. 2, the front cover 200 may include a front horizontal part 200H extending in the horizontal direction (i.e., the first direction DR1 and/or the second direction DR2) and a front vertical part 200V extending from the front horizontal part 200H in the vertical direction (i.e., the third direction DR3).

The front horizontal part 200H may be exposed to the outside. Hence, the user may observe the front horizontal part 200H in the front of the display device 11.

The front vertical part 200V may be used to connect the front cover 200 to the back cover 100 or connect the front cover 200 to the display module 300.

It may be preferable, but not required, that the size of the front horizontal part 200H is relatively small and the size of the front vertical part 200V is relatively large, so that the front cover 200 is strongly connected to the back cover 100 and/or the display module 300 while obtaining a visual effect, in which a display area of an image looks larger than its actual size.

Preferably, a width W1 of the front horizontal part 200H in the horizontal direction (i.e., the first direction DR1 and/or the second direction DR2) may be less than a width W2 of the front vertical part 200V in the vertical direction (i.e., the third direction DR3).

Figure 7:
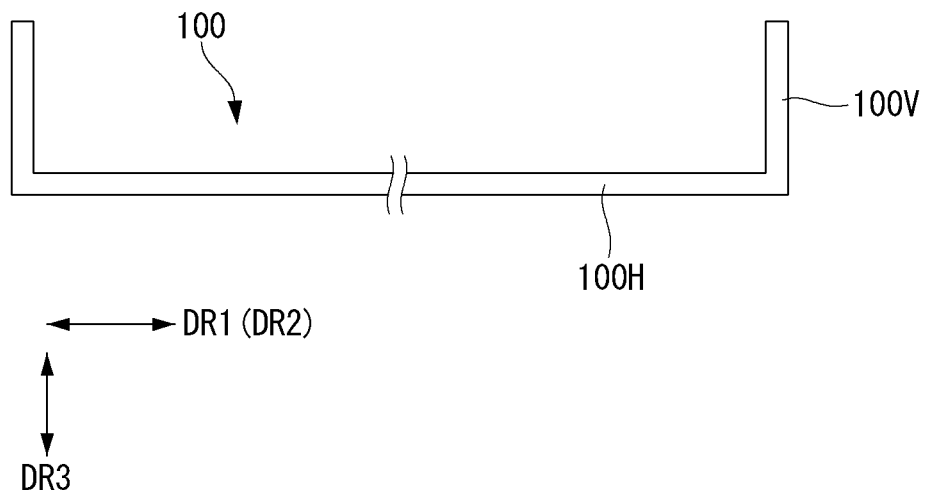

As shown in FIG. 7, the back cover 100 may include a back horizontal part 100H, which extends in the horizontal direction (i.e., the first direction DR1 and/or the second direction DR2) and is positioned in the rear of the display module 300, and a back vertical part 100V extending from the back horizontal part 100H in the vertical direction (i.e., the third direction DR3).

The back vertical part 100V of the back cover 100 may correspond to the front vertical part 200V of the front cover 200. This is described in detail below.

Figure 8:
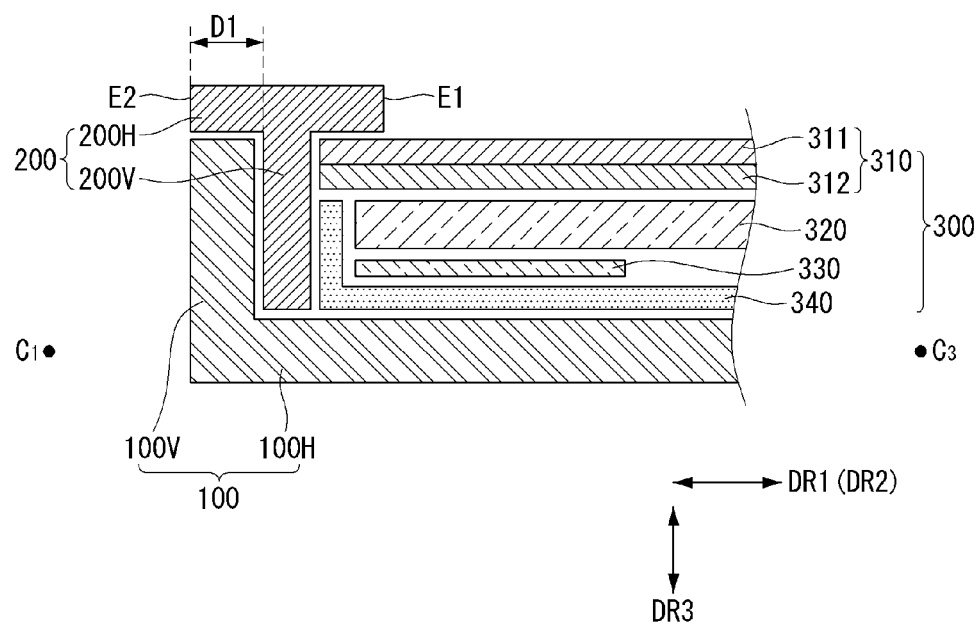

As shown in FIG. 8 showing a cross-sectional view of the display device 10 taken along line C1-C3 of FIG. 1, the front horizontal part 200H of the front cover 200 may cover an edge of a front surface of the display module 300 in a state where the front cover 200, the display module 300, and the back cover 100 are coupled. More specifically, the front horizontal part 200H of the front cover 200 may cover an edge of the front surface of the display panel 310 of the display module 300.

The front vertical part 200V of the front cover 200 may be positioned on the side of the display module 300.

The front vertical part 200V may be positioned between the display module 300 and the back vertical part 100V of the back cover 100 in the horizontal direction (i.e., the first direction DR1 and/or the second direction DR2).

The front horizontal part 200H of the front cover 200 may include a first end part E1 positioned in the front of the front surface of the display module 300 and a second end part E2 positioned opposite the first end part E1.

The second end part E2 of the front horizontal part 200H may protrude from a connection portion between the front horizontal part 200H and the front vertical part 200V by a predetermined length Dl in the horizontal direction (i.e., the first direction DR1 and/or the second direction DR2).

Hence, the second end part E2 may overlap the back vertical part 100V of the back cover 100 in the vertical direction (i.e., the third direction DR3).

In this instance, the side of the second end part E2 of the front horizontal part 200H may be exposed.

Figure 9:
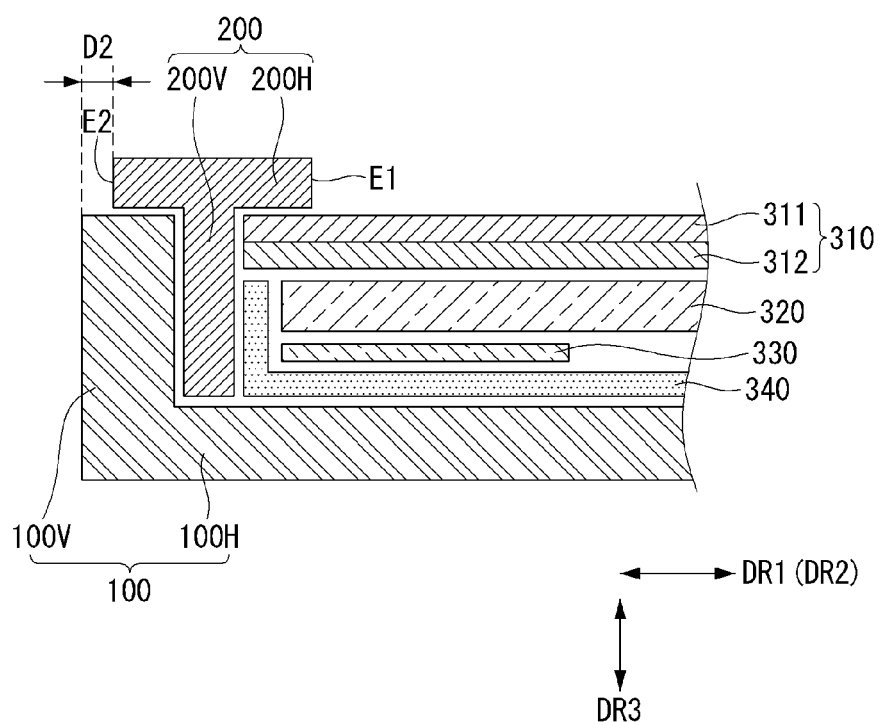

As shown in FIG. 9, the back vertical part 100V of the back cover 100 may be sufficiently thick. Hence, the back vertical part 100V of the back cover 100 may protrude from the second end part E2 of the front horizontal part 200H by a predetermined length D2 in the horizontal direction (i.e., the first direction DR1 and/or the second direction DR2).

Figure 10:
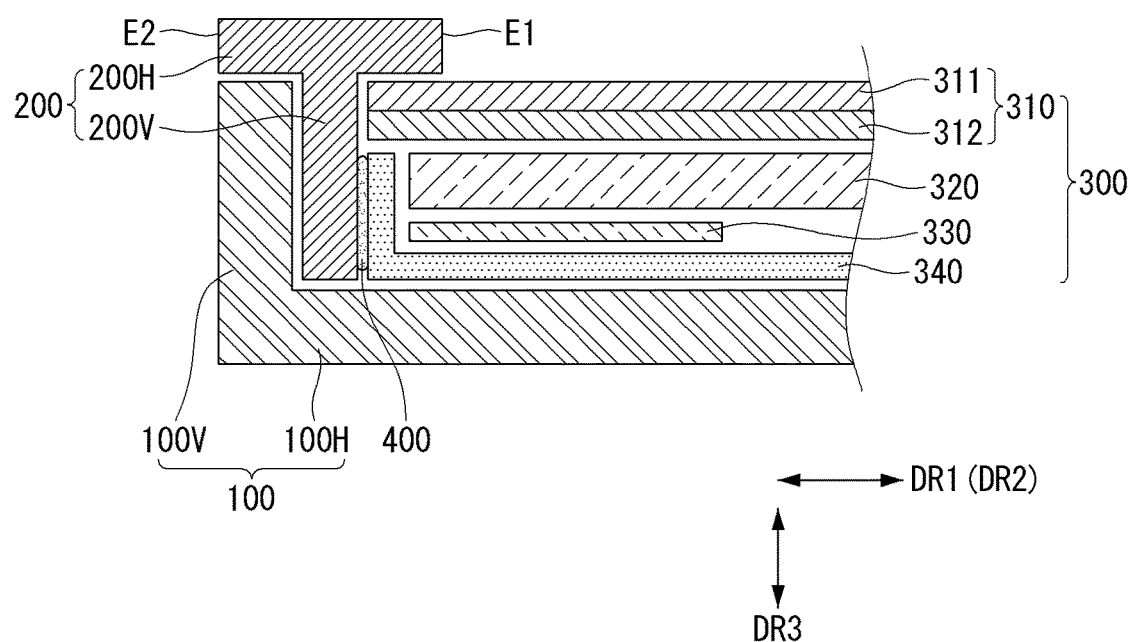

As shown in FIG. 10, a buffer 400 having elasticity may be disposed between the front vertical part 200V of the front cover 200 and the display module 300. It may be preferable, but not required, that the buffer 400 has adhesion.

More specifically, the buffer 400 having the adhesion may be disposed between the front vertical part 200V of the front cover 200 and the frame 340 of the display module 300.

In this instance, the buffer 400 may attach the front cover 200 to the display module 300. Hence, the structural stability of the display device 11 may be improved, and the manufacturing process may be simplified.

The buffer 400 may be an adhesive sheet.

Figure 11:
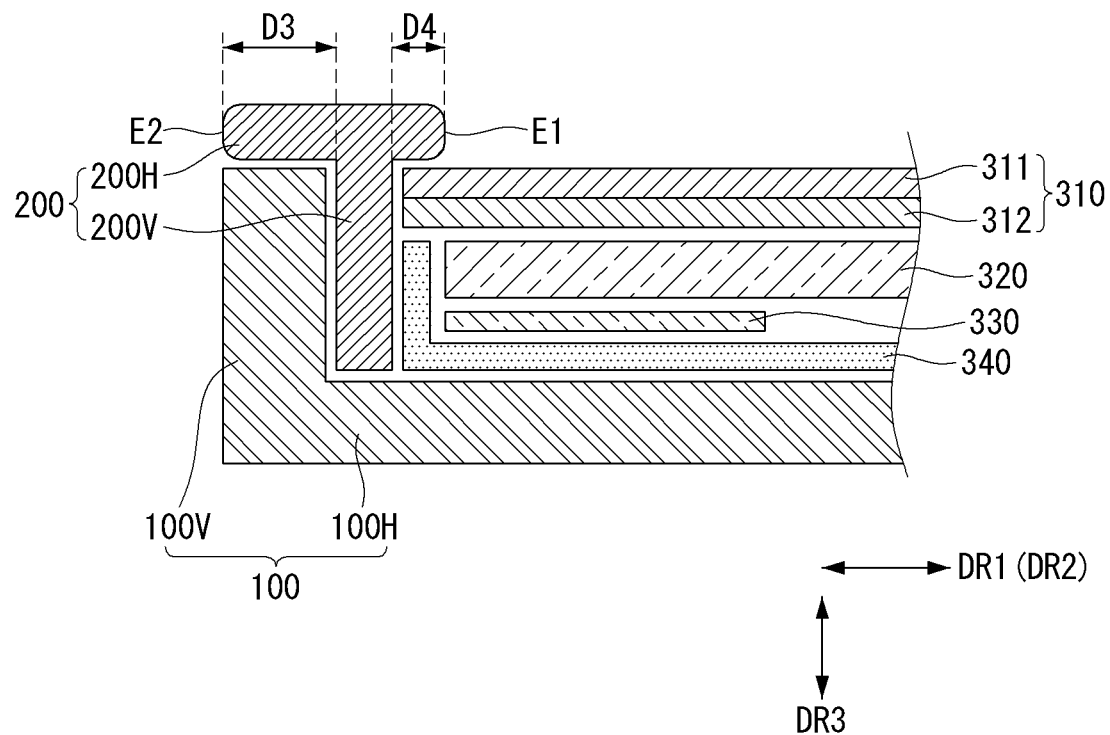

As shown in FIG. 11, a first distance D4 between the connection portion between the front horizontal part 200H and the front vertical part 200V and the first end part E1 of the front horizontal part 200H in the horizontal direction (i.e., the first direction DR1 and/or the second direction DR2) may be less than a second distance D3 between the connection portion between the front horizontal part 200H and the front vertical part 200V and the second end part E2 of the front horizontal part 200H in the horizontal direction (i.e., the first direction DR1 and/or the second direction DR2).

In this instance, a reduction in the rigidity of the display device 11 may be prevented, and the size of a portion of the display module 300 covered by the front cover 200 may be reduced.

The front horizontal part 200H of the front cover 200 may include at least two portions each having a different thickness.

Figure 12:
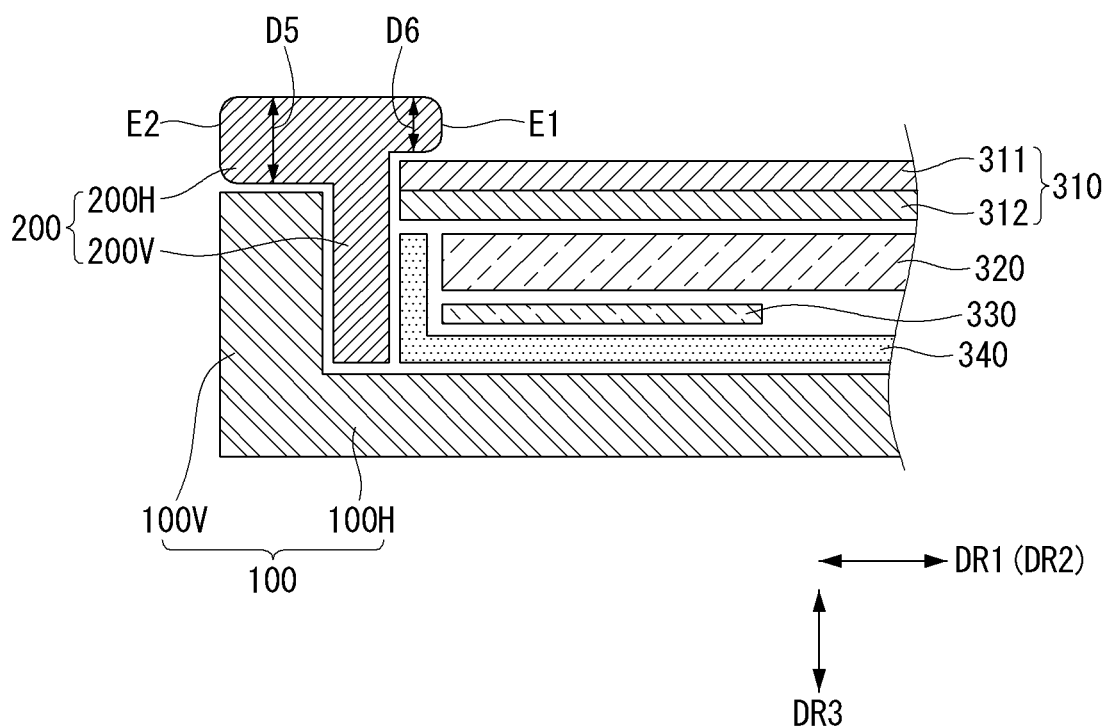

For example, as shown in FIG. 12, a thickness D6 of the first end part E1 of the front horizontal part 200H may be less than a thickness D5 of the second end part E2.

In this instance, a reduction in the rigidity of the display device 11 may be prevented, and a visual effect, in which the display module 300 looks more remarkably, may be obtained.

The back cover 100 and the front cover 200 may be connected to each other.

Figure 13:
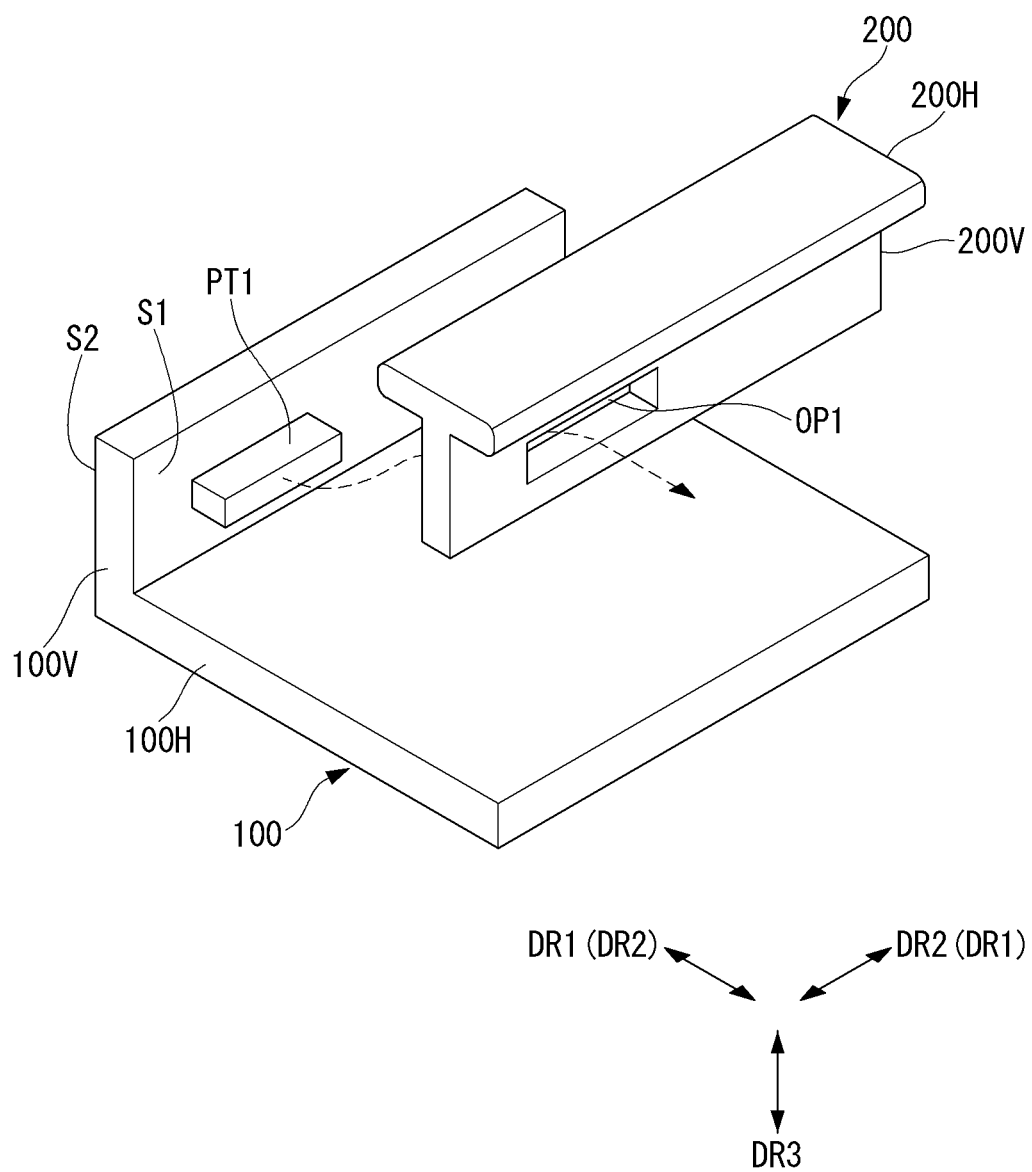

For this, as shown in FIG. 13, the front vertical part 200V of the front cover 200 may have an opening OP1.

The back vertical part 100V of the back cover 100 may have a protrusion PT1 corresponding to the opening OP1. More specifically, the protrusion PT1 may extend from an inner surface S1 of the back vertical part 100V of the back cover 100 in a direction toward the display module 300. The protrusion PT1 of the back vertical part 100V of the back cover 100 may be called a first protrusion.

An outer surface S2 of the back vertical part 100V of the back cover 100 is a surface opposite the inner surface S1 and may be exposed to the outside.

Figure 14:
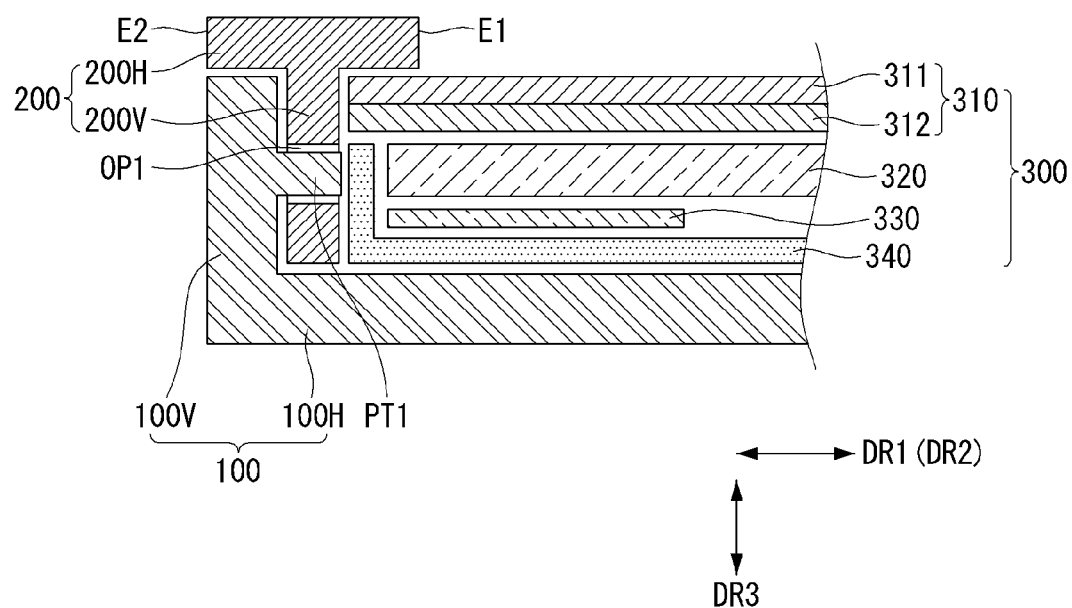

As shown in FIG. 14, the protrusion PT1 of the back cover 100 may be inserted into the opening OP1 of the front cover 200. Hence, the back cover 100 and the front cover 200 may be connected to each other in such a manner.

Figure 15:
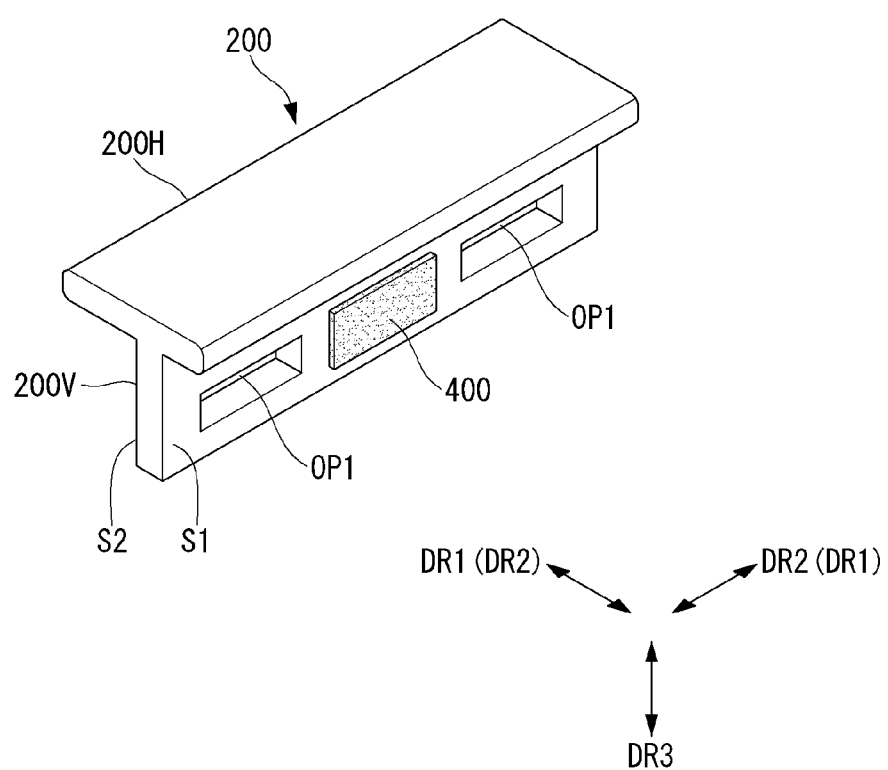

As shown in FIG. 15, the front vertical part 200V of the front cover 200 may have a plurality of openings OP1.

In this instance, the buffer 400 may be positioned between the openings OP1. More specifically, the buffer 400 may be positioned on an inner surface S1 of the front vertical part 200V of the front cover 200.

Each of the back cover 100 and the front cover 200 may have a hook used to hook them, so as to connect the back cover 100 with the front cover 200.

Figure 16:
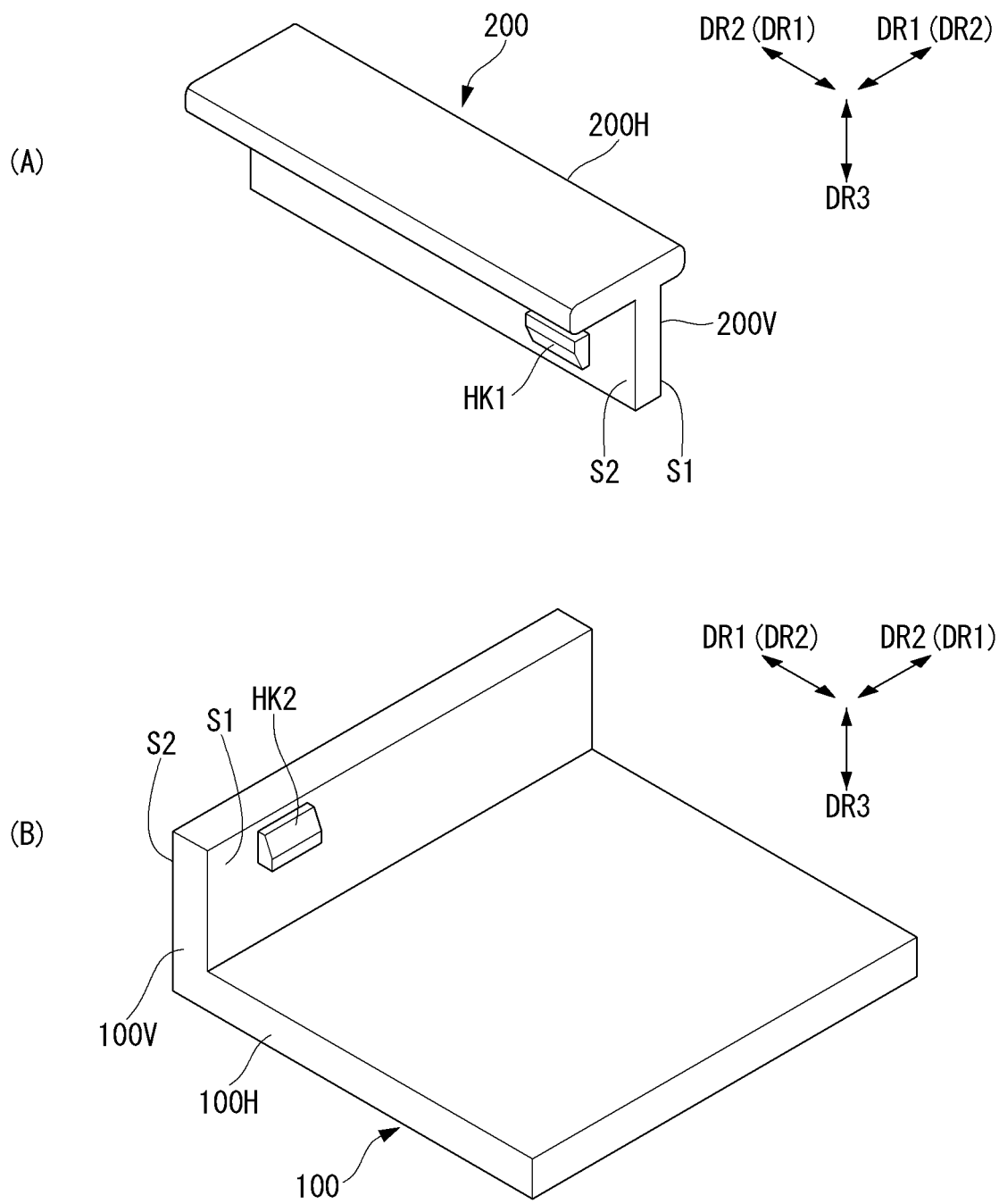

For example, as shown in (A) of FIG. 16, a first hook HK1 may be formed on the front vertical part 200V of the front cover 200. More specifically, the first hook HK1 may be formed on an outer surface S2 opposite the inner surface S1 of the front vertical part 200V of the front cover 200.

As shown in (B) of FIG. 16, a second hook HK2 corresponding to the first hook HK1 may be formed on the back vertical part 100V of the back cover 100. More specifically, the second hook HK2 may be formed on the inner surface S1 of the back vertical part 100V of the back cover 100.

Figure 17:
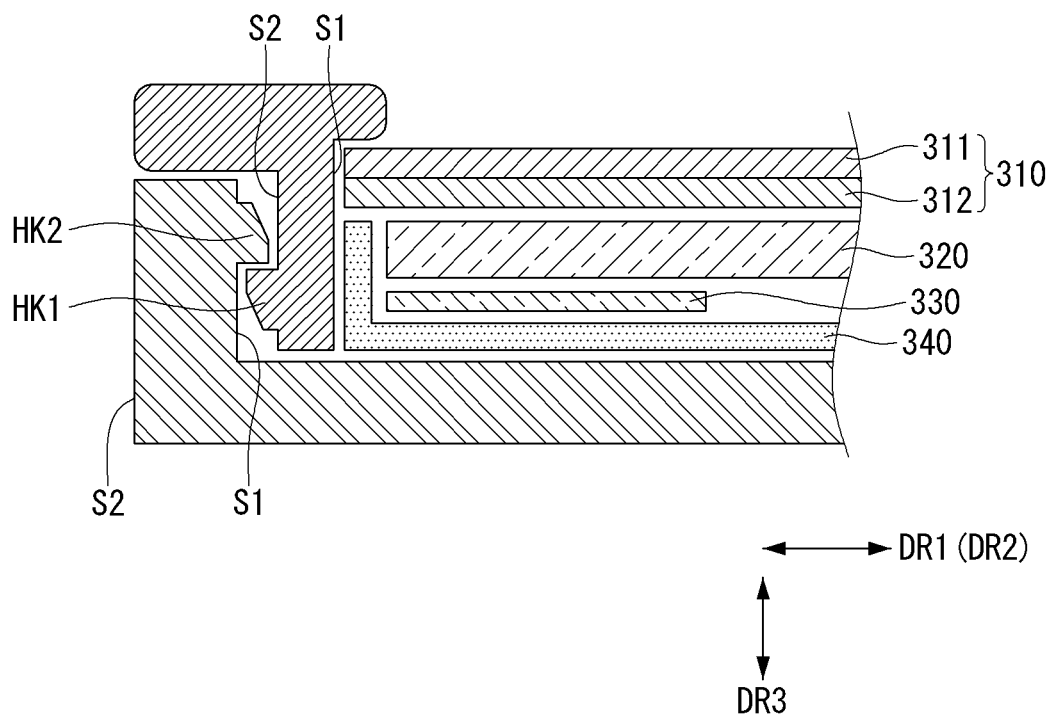

As shown in FIG. 17, the first hook HK1 and the second hook HK2 may be engaged with each other. Hence, the back cover 100 and the front cover 200 may be connected to each other in such a manner.

Figure 18:
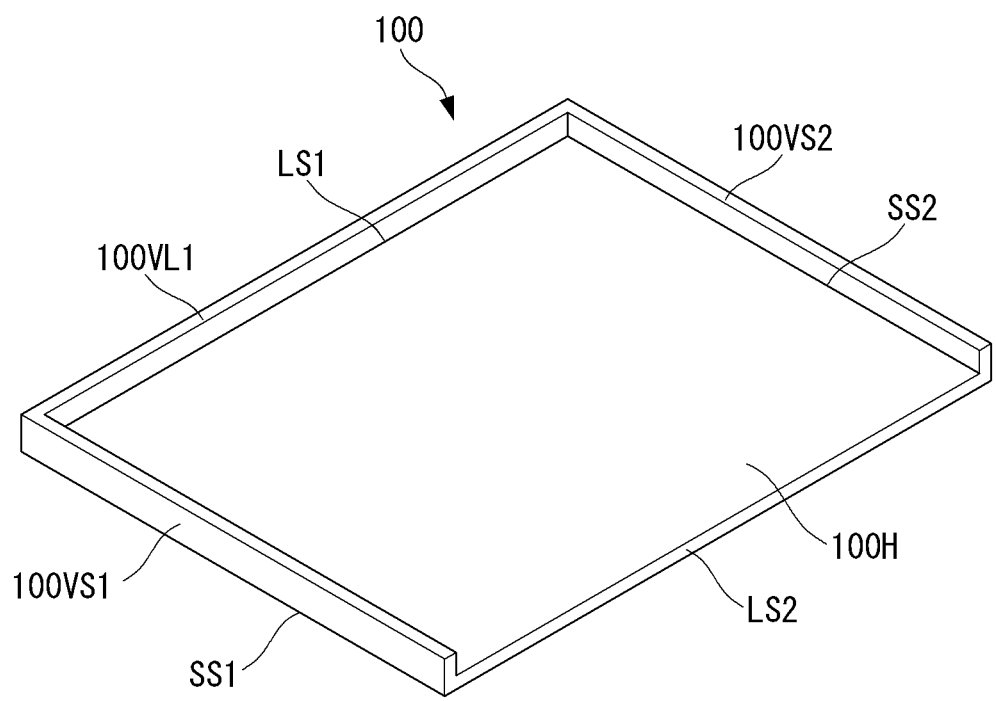
Figure 19:
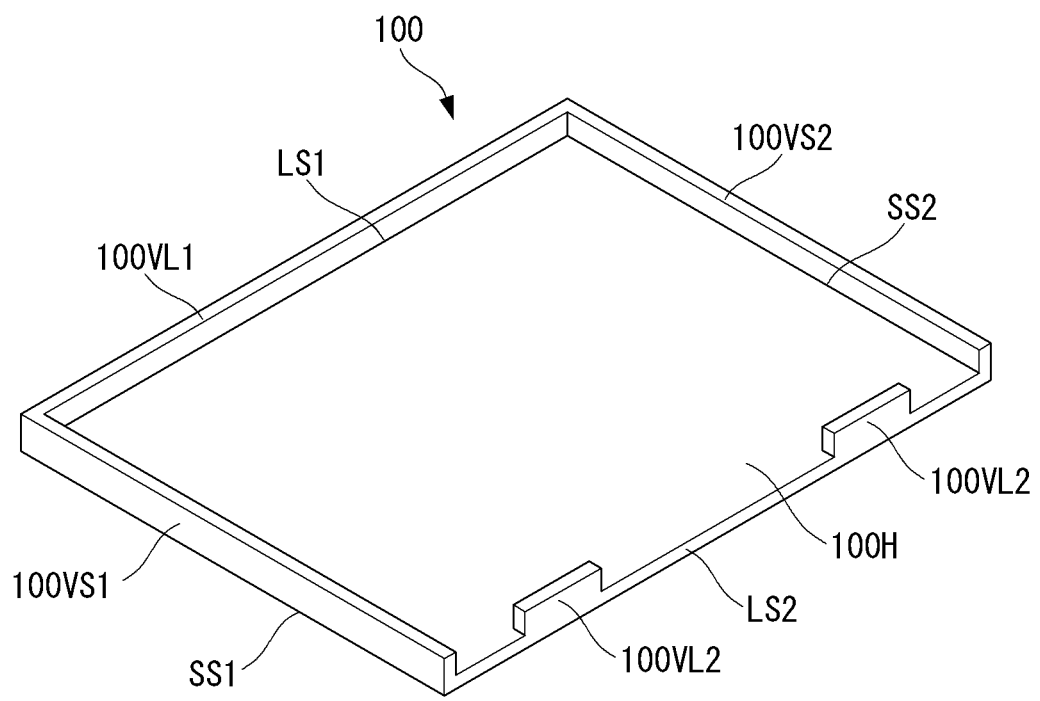

As shown in FIGS. 18 and 19, the back horizontal part 100H of the back cover 100 may include a first long side LS1, a second long side LS2 opposite the first long side LS1, a first short side SS1 adjacent to the first long side LS1 and the second long side LS2, and a second short side SS2 which is adjacent to the first long side LS1 and the second long side LS2 and is opposite to the first short side SS1.

The first long side LS1, the second long side LS2, the first short side SS1, and the second short side SS2 of the back horizontal part 100H may correspond to the first long side LS1, the second long side LS2, the first short side SS1, and the second short side SS2 of the display module 300, respectively.

The back vertical part 100V of the back cover 100 may include a first back vertical part 100VL1 corresponding to the first long side LS1 of the back horizontal part 100H, a second back vertical part 100VS1 corresponding to the first short side SS1 adjacent to the first long side LS1 of the back horizontal part 100H, and a third back vertical part 100VS2 corresponding to the second short side SS2 opposite the first short side SS1 of the back horizontal part 100H.

The second long side LS2 opposite the first long side LS1 of the back horizontal part 100H may include an opening of the back cover 100 in the horizontal direction (i.e., the first direction DR1 and/or the second direction DR2). In other words, the back cover 100 on the second long side LS2 of the back horizontal part 100H may be opened in the horizontal direction (i.e., the first direction DR1 and/or the second direction DR2).

For example, as shown in FIG. 18, the back cover 100 on the second long side LS2 of the back horizontal part 100H may be entirely opened in the horizontal direction (i.e., the first direction DR1 and/or the second direction DR2).

Alternatively, as shown in FIG. 19, the back cover 100 on the second long side LS2 of the back horizontal part 100H may be partially opened in the horizontal direction (i.e., the first direction DR1 and/or the second direction DR2).

In this instance, the back vertical part 100V of the back cover 100 may include a fourth back vertical part 100VL2 corresponding to the second long side LS2 of the back horizontal part 100H.

Figure 20:
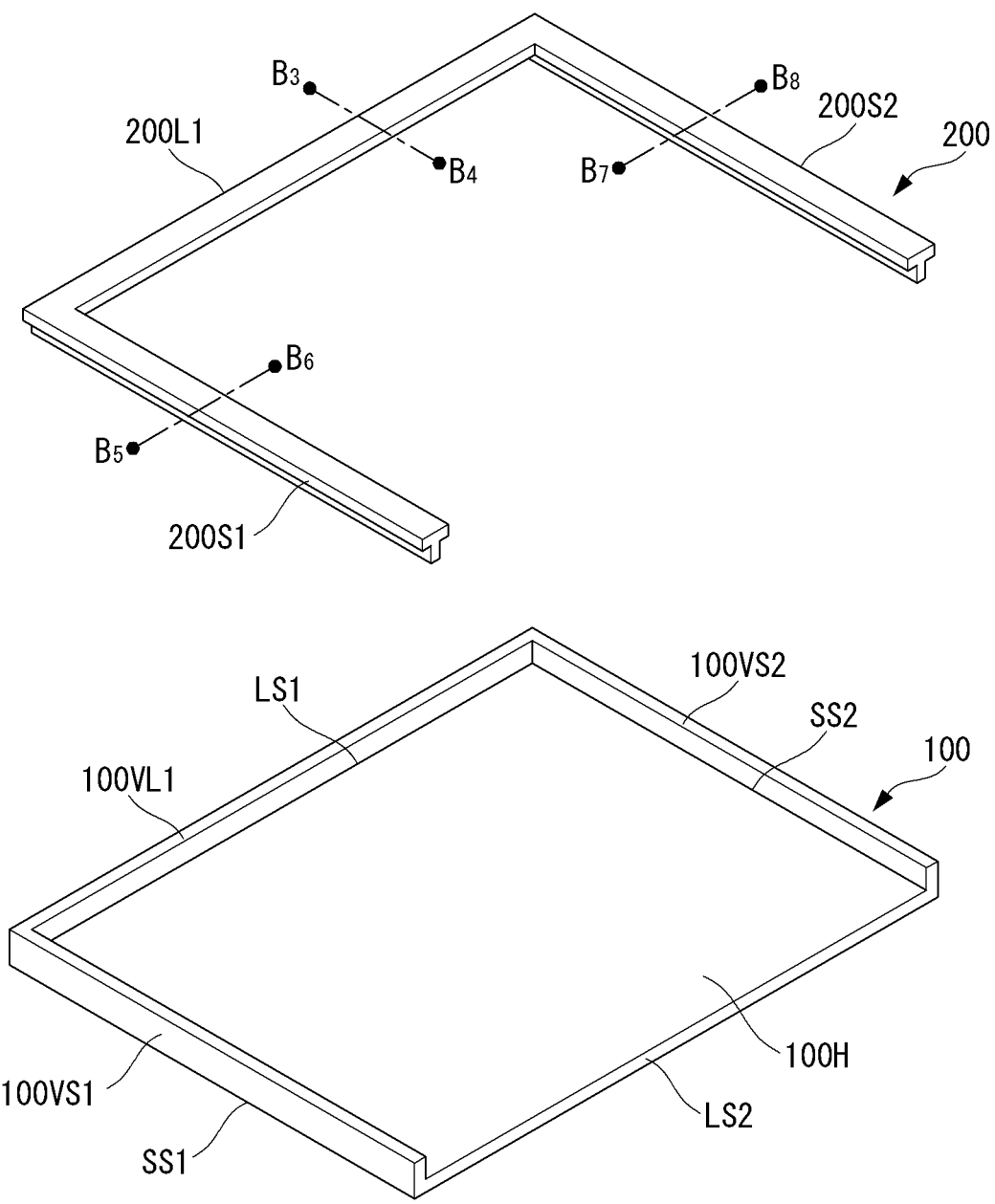

As shown in FIG. 20, the front cover 200 may include a first front cover 200L1 corresponding to the first long side LS 1 of the back horizontal part 100H, a second front cover 200S1 corresponding to the first short side SS1 of the back horizontal part 100H, and a third front cover 200S2 corresponding to the second short side SS2 of the back horizontal part 100H.

As shown in (A) of FIG. 21, the first front cover 200L1 may include a first front horizontal part 200HL1 and a first front vertical part 200VL1 corresponding to the first back vertical part 100VL1. Although not shown, the first front horizontal part 200HL1 of the first front cover 200L1 may cover an edge of the front surface of the display module 300 on the first long side LS1 of the display module 300. This may be sufficiently inferred from the description of FIG. 8.

As shown in (B) of FIG. 21, the second front cover 200S1 may include a second front horizontal part 200HS1 and a second front vertical part 200VS1 corresponding to the second back vertical part 100VS1. The second front horizontal part 200HS1 of the second front cover 200S1 may cover an edge of the front surface of the display module 300 on the first short side SS1 of the display module 300.

As shown in (C) of FIG. 21, the third front cover 200S2 may include a third front horizontal part 200HS2 and a third front vertical part 200VS2 corresponding to the third back vertical part 100VS2. The third front horizontal part 200HS2 of the third front cover 200S2 may cover an edge of the front surface of the display module 300 on the second short side SS2 of the display module 300.

As shown in (B) and (C) of FIG. 21, a first hook HK1 may be formed on each of outer surfaces S2 of the second front vertical part 200VS1 and the third front vertical part 200VS2 of the front cover 200.

Figure 22:
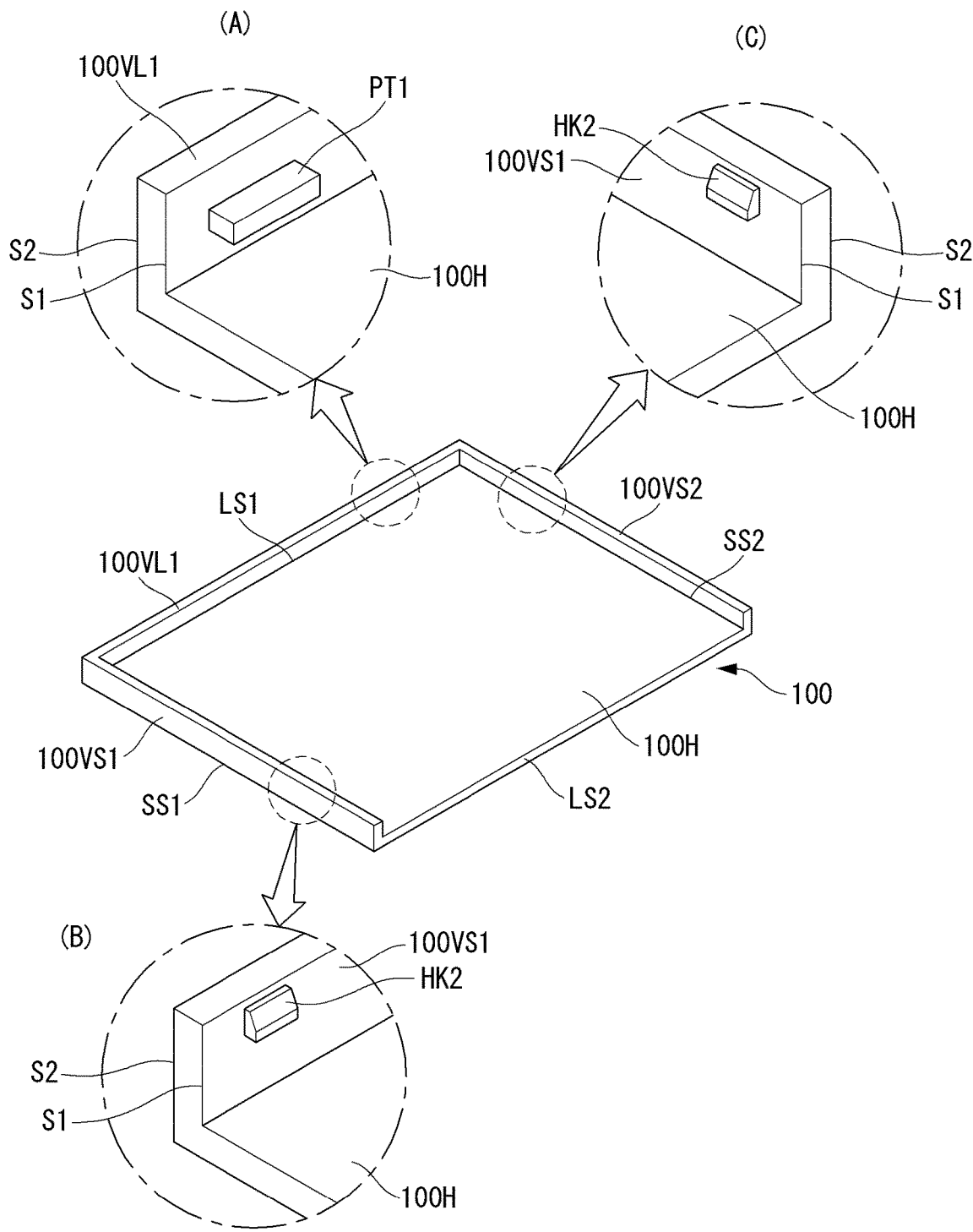

Further, as shown in (B) and (C) of FIG. 22, a second hook HK2 opposite the first hook HK1 may be formed on each of inner surfaces S1 of the second back vertical part 100VS1 and the third back vertical part 100VS2 of the back cover 100.

As shown in (A) of FIG. 21, the first back vertical part 100VL1 may have an opening OP1.

Further, as shown in (A) of FIG. 22, a protrusion PT1 inserted into the opening OP1 may be formed on the inner surface S1 of the first back vertical part 100VL1 of the back cover 100.

In the above-described configuration, the display device 11 may be manufactured in a sliding manner.

A method for manufacturing the display device 11 is described below.

Figure 23:
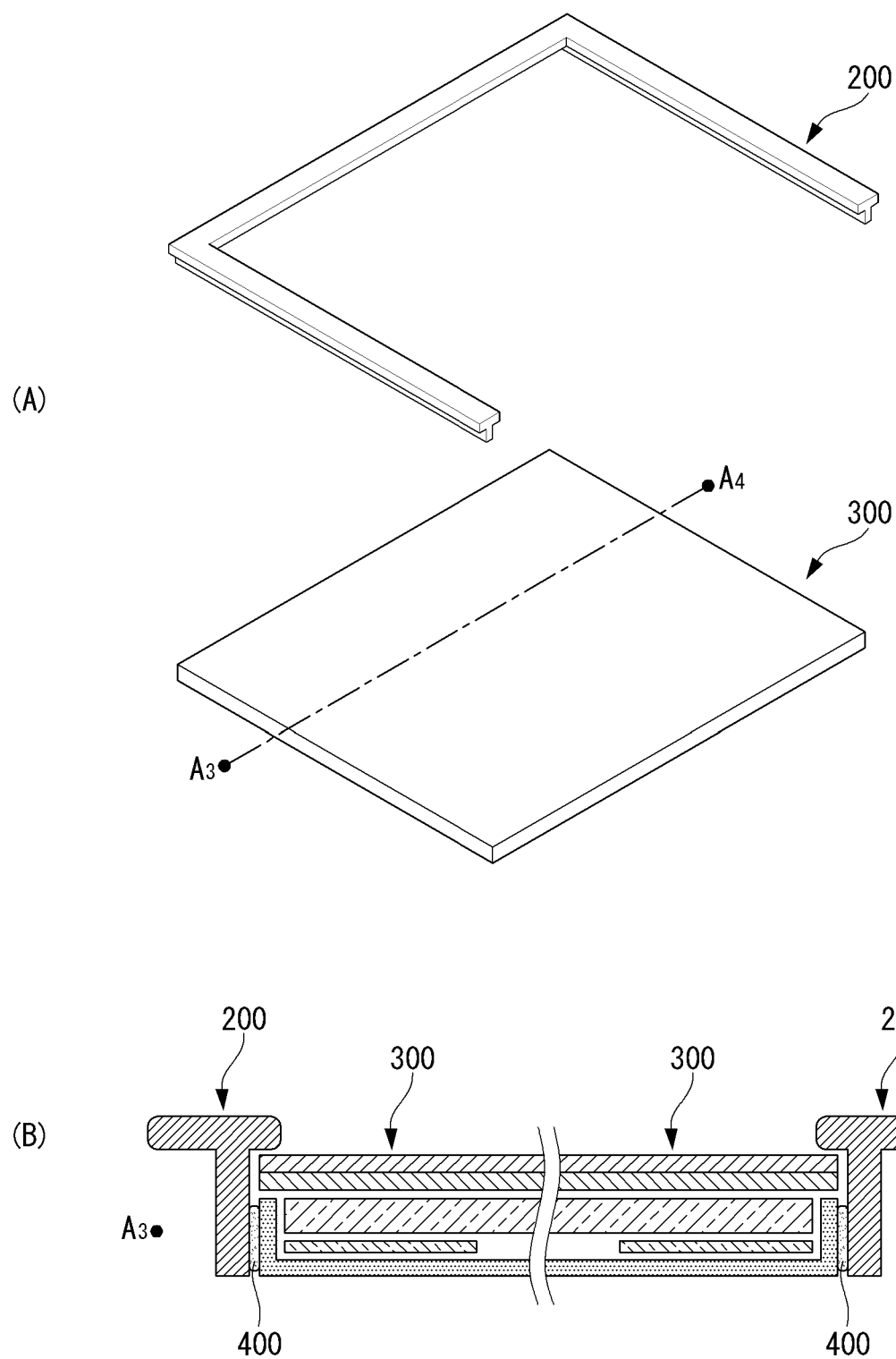

As shown in (A) of FIG. 23, the display module 300 and the front cover 200 may be coupled with each other.

(B) of FIG. 23 shows a state where the display module 300 and the front cover 200 are coupled with each other.

As shown in (B) of FIG. 23, when the buffer 400 with the adhesion is disposed between the display module 300 and the front vertical part 200V of the front cover 200, a coupling strength between the display module 300 and the front cover 200 may be improved.

Figure 24:
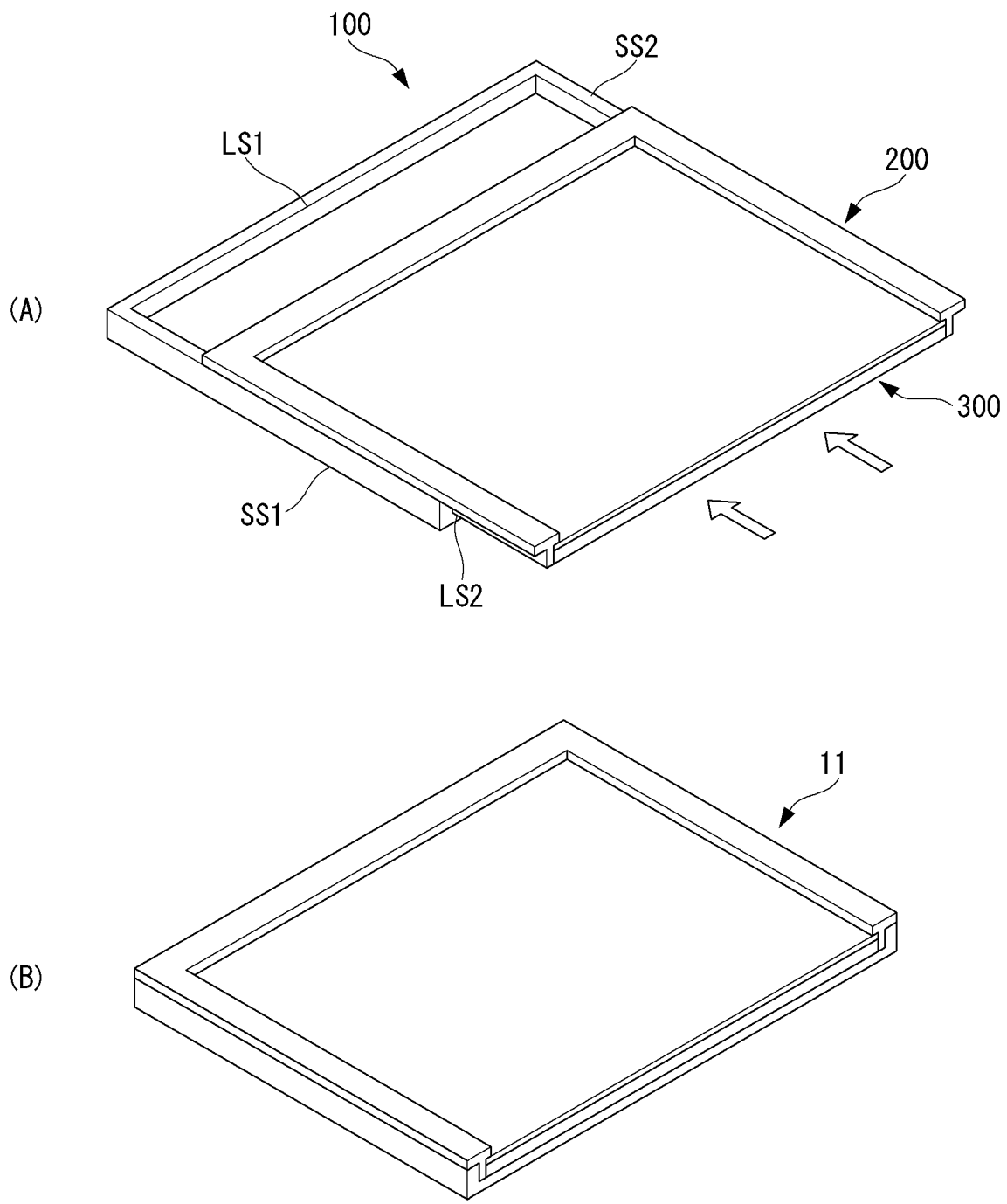

Next, as shown in (A) of FIG. 24, a coupled structure of the display module 300 and the front cover 200 may be pushed up in a sliding manner in a state where the coupled structure is temporarily installed on the back cover 200.

Hence, as shown in (B) of FIG. 24, the coupled structure may be installed on the back cover 100.

As described above, when the coupled structure is connected to the back cover 100 in the sliding manner, the first hook HK1 and the second hook HK2 are naturally engaged with each other. Further, the protrusion PT1 may be inserted into the opening OP1.

Figure 25:
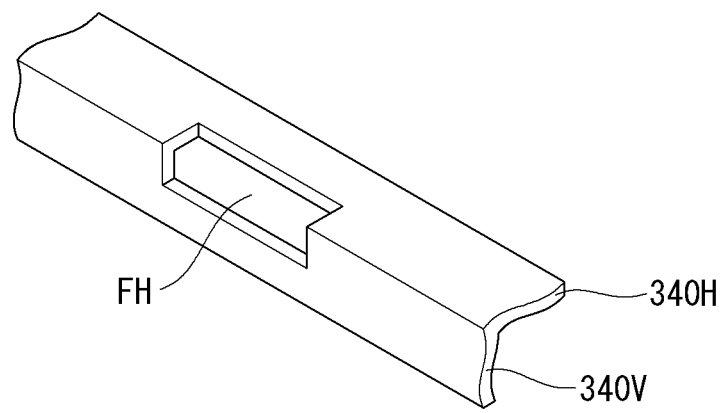

As shown in FIG. 25, the frame 340 of the display module 300 may have a frame hole FH.

The frame hole FH of the frame 340 may be formed by partially removing the horizontal frame 340H and the vertical frame 340V.

Alternatively, the frame 340 may have a plurality of frame holes FH.

Figure 26:
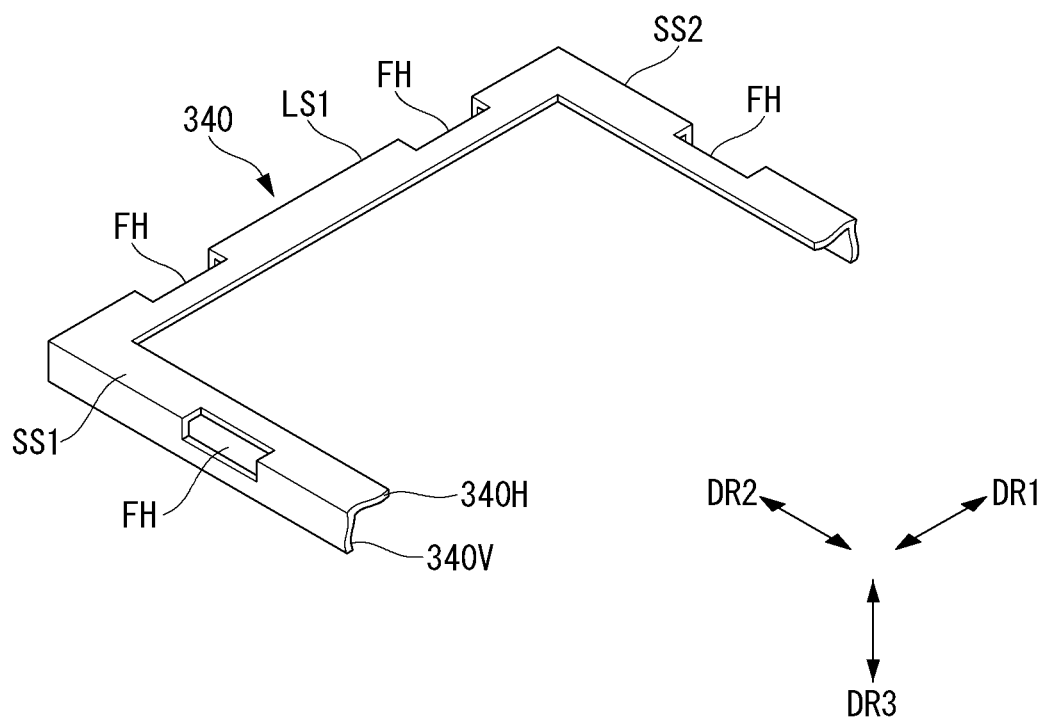

For example, as shown in FIG. 26, at least one frame hole FH may be formed on each of the first long side LS1, the first short side SS1, and the second short side SS2 of the frame 340.

Figure 27:
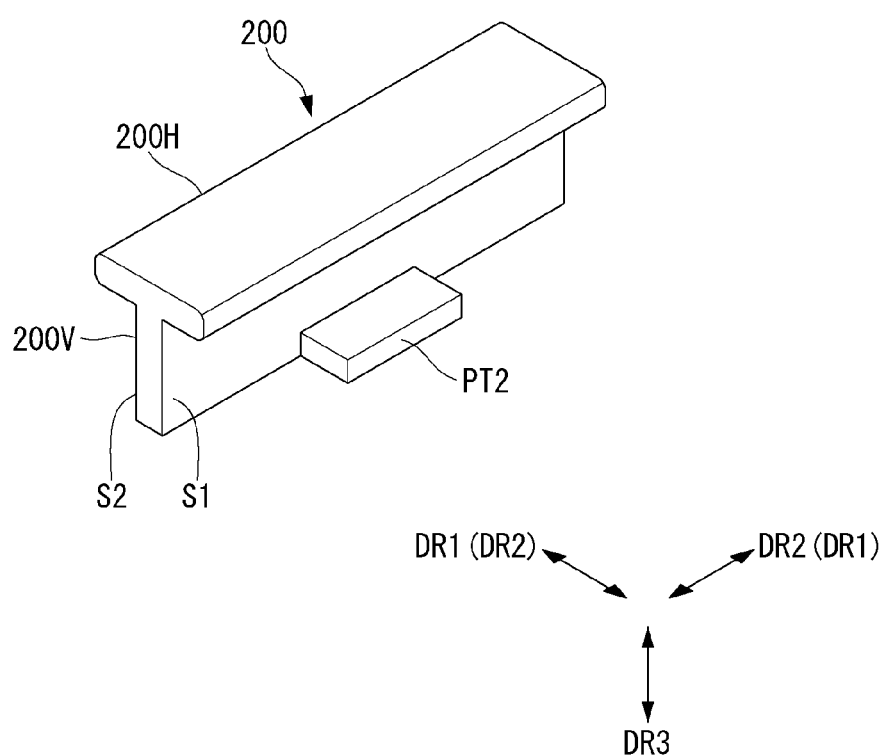

The front cover 200 may include a protrusion inserted into the frame hole FH. For example, as shown in FIG. 27, a protrusion PT2 may extend from the inner surface S1 of the front vertical part 200V of the front cover 200. The protrusion PT2 corresponding to the frame hole FH may be called a second protrusion.

Figure 28:
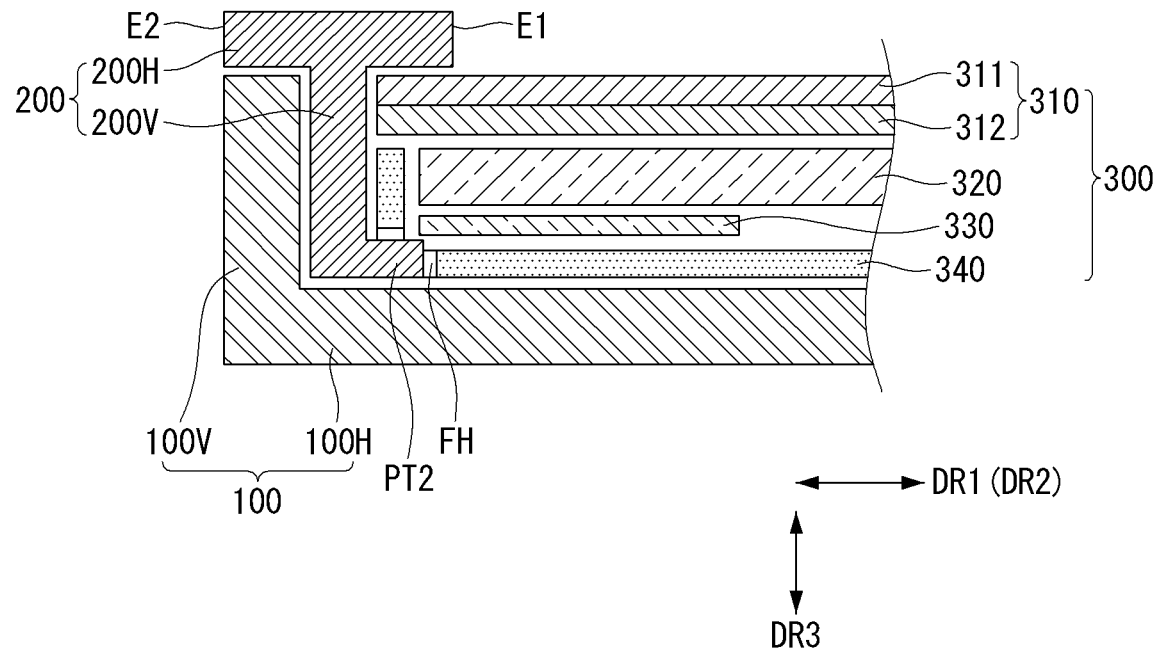

As shown in FIG. 28, the second protrusion PT2 may be inserted into the frame hole FH of the frame 340.

Hence, the coupling strength between the display module 300 and the front cover 200 may be improved.

Figure 29:
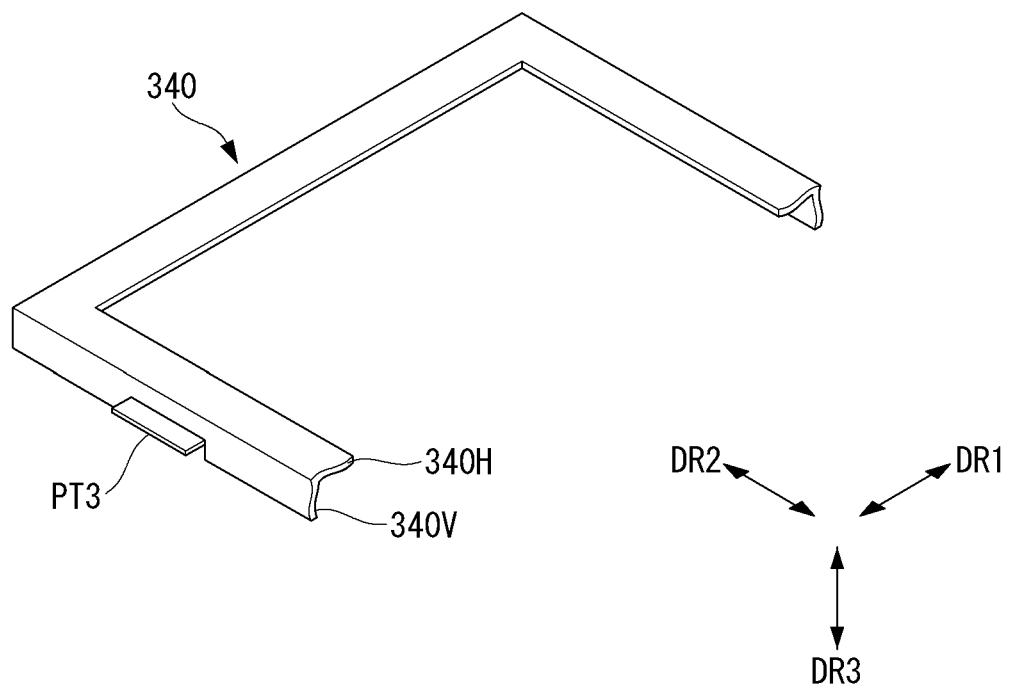

As shown in FIG. 29, the frame 340 may include a frame protrusion PT3.

Figure 30:
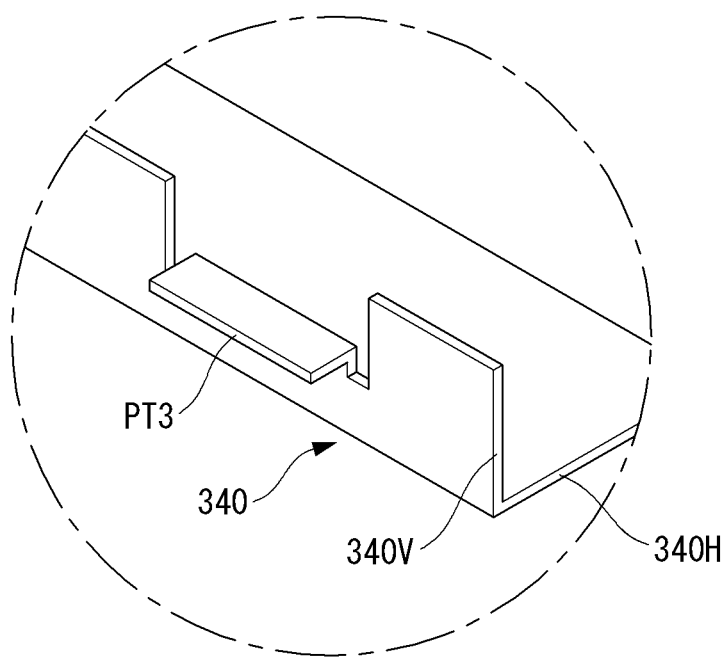

As shown in FIG. 30, the frame protrusion PT3 may extend from the vertical frame 340V of the frame 340 toward the front vertical part 200V of the front cover 200.

Alternatively, the frame protrusion PT3 may be formed by folding a portion of the vertical frame 340V of the frame 340.

The frame protrusion PT3 may be called a third protrusion.

Figure 31:
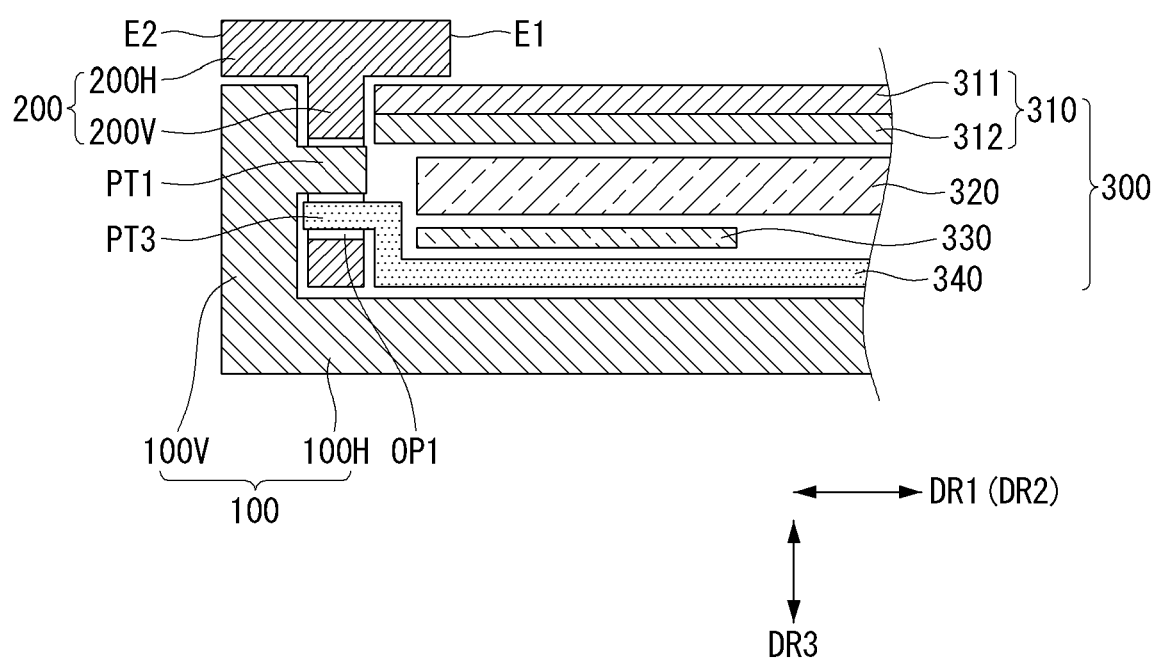

As shown in FIG. 31, the frame protrusion PT3 may be inserted into the opening OP1 of the front vertical part 200V of the front cover 200.

Not only the frame protrusion PT3 but also the protrusion PT1 of the back vertical part 100V of the back cover 100 may be inserted into the opening OP1 of the front vertical part 200V of the front cover 200.

As described above with reference to FIGS. 23 and 24, considering that the coupled structure formed by coupling the display module 300 and the front cover 200 is installed on the back cover 200 in the sliding manner, not only the frame protrusion PT3 but also the protrusion PT1 of the back vertical part 100V of the back cover 100 may be inserted into the opening OP1 of the front vertical part 200V of the front cover 200 on the first long side LS1 of the display device 11.

The mold 330 of the display module 300 may be connected to the back cover 100.

Figure 32:
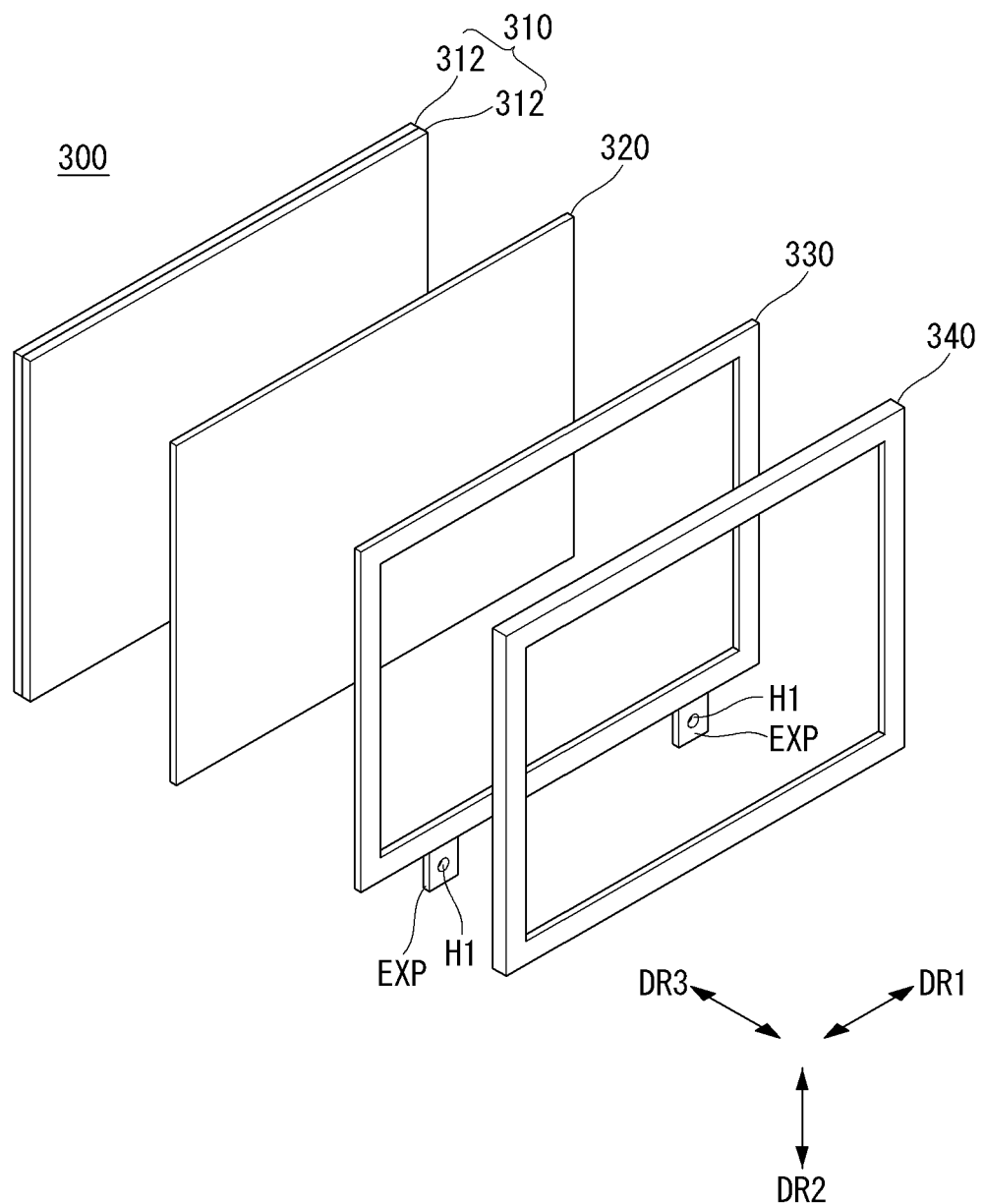

For this, as shown in FIG. 32, the mold 330 may include an extension EXP having a first hole H1.

Figure 33:
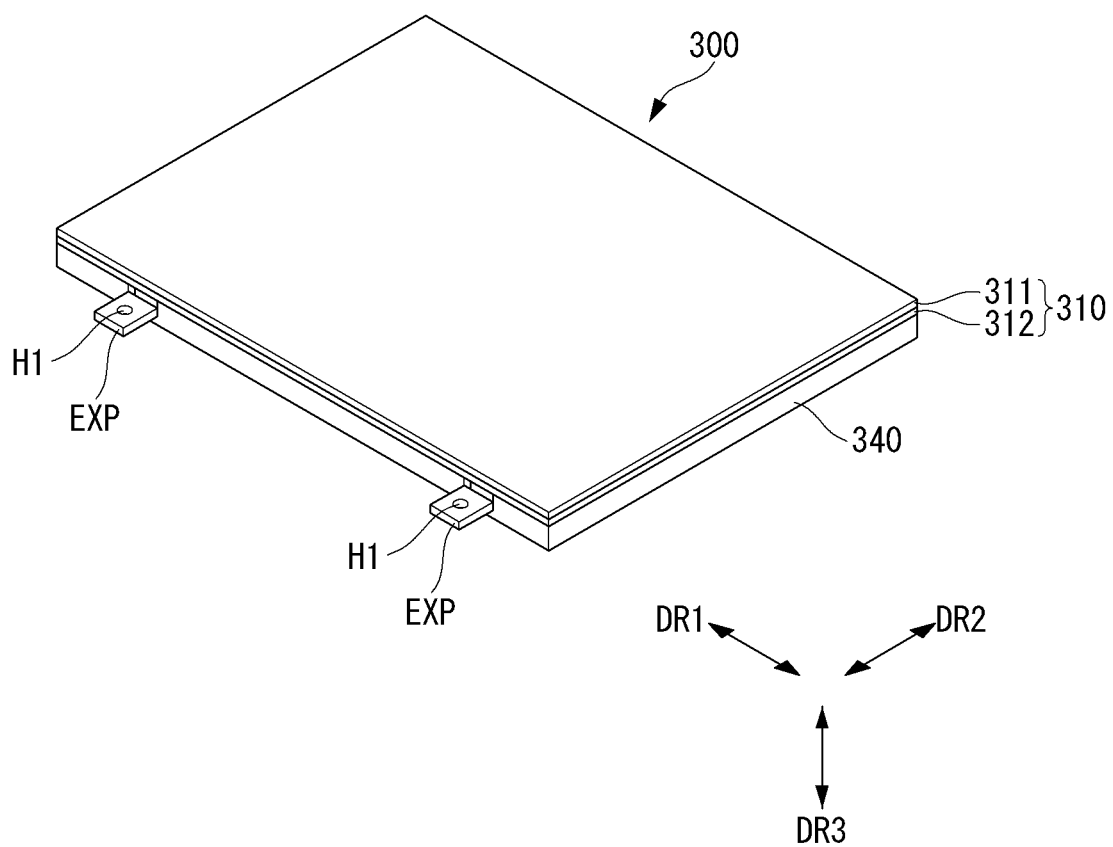

As shown in FIG. 33, the extension EXP may be exposed to the outside in a state where the display panel 310, the mold 330, and the frame 340 are coupled.

The back cover 100 may include a base 100HB corresponding to the extension EXP. The base 100HB may have a groove HW1.

Figure 34:
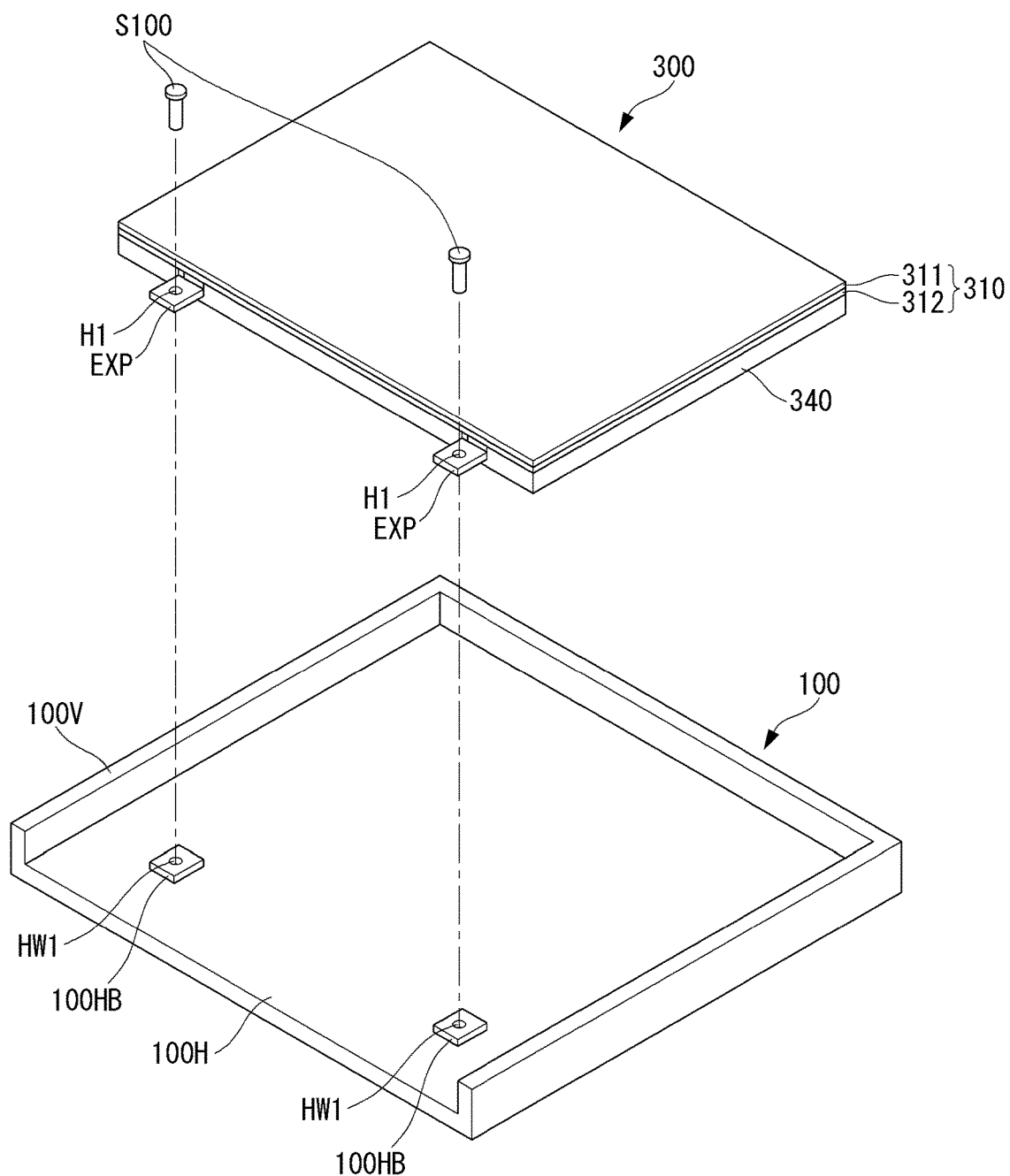

As shown in FIG. 34, a fastening means S100 such as a screw may pass through the first hole H1 of the extension EXP of the mold 330 and may be inserted into the groove HW1 of the base 100HB of the back cover 100.

Hence, the display module 300 may be connected to the back cover 100.

Figure 35:
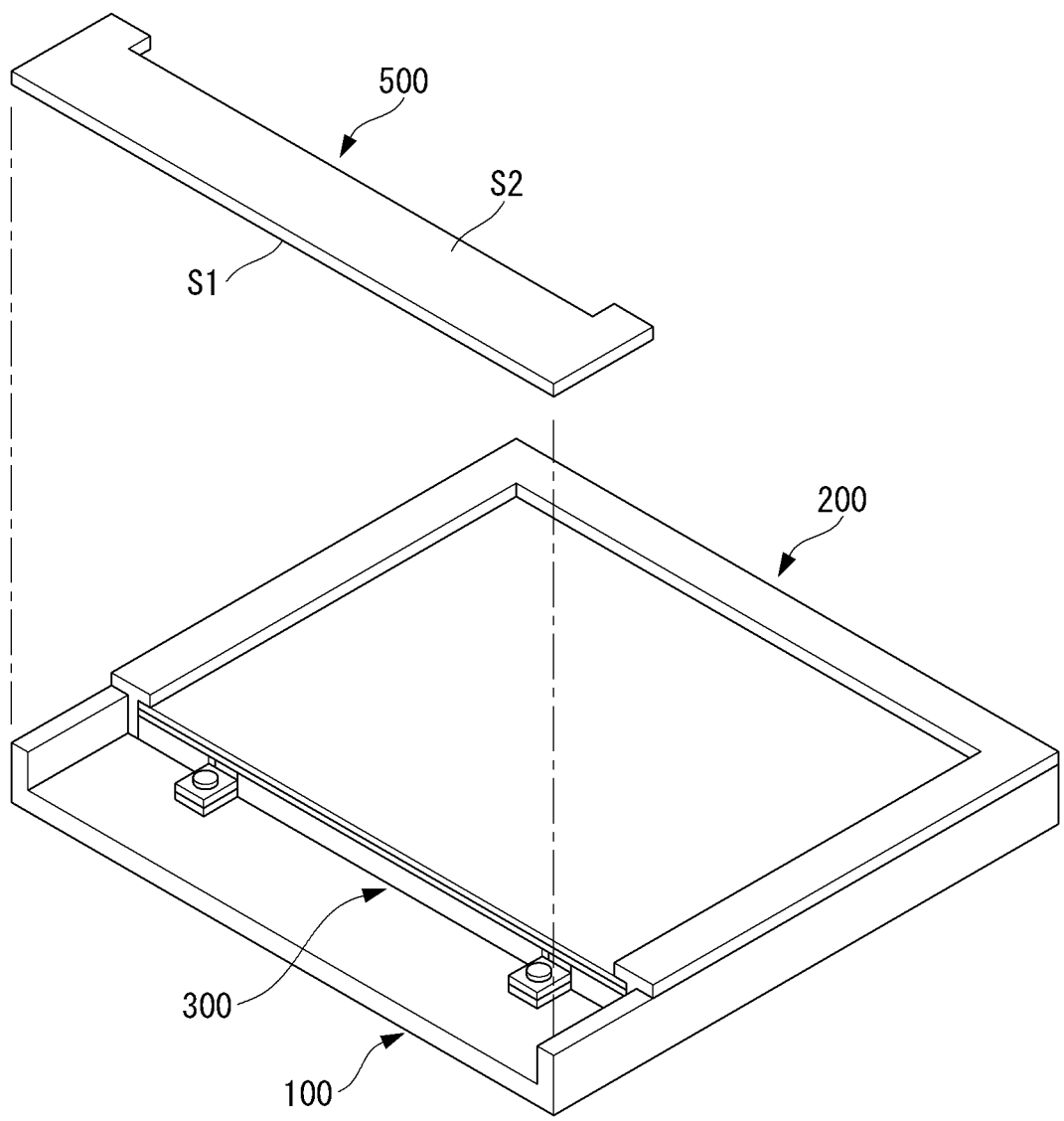

As shown in FIG. 35, the display device 11 according to the embodiment of the invention may further include a bottom cover 500.

The bottom cover 500 may include a portion covering an opening of the back cover 100, which is positioned on the second long side LS2 of the back cover 100, and an edge of the front surface of the display module 300.

Figure 36:
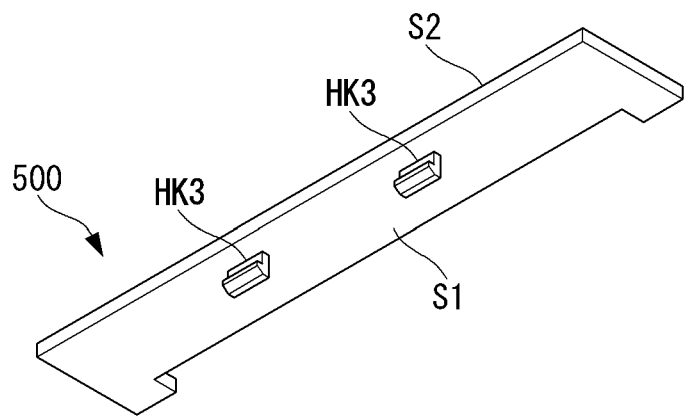

As shown in FIG. 36, the bottom cover 500 may include a third hook HK3.

The bottom cover 500 may include an outer surface S2 exposed to the outside and an inner surface S1 opposite the outer surface S2. The third hook HK3 of the bottom cover 500 may extend from the inner surface S1 of the bottom cover 500 toward the back horizontal part 100H of the back cover 100.

Figure 37:
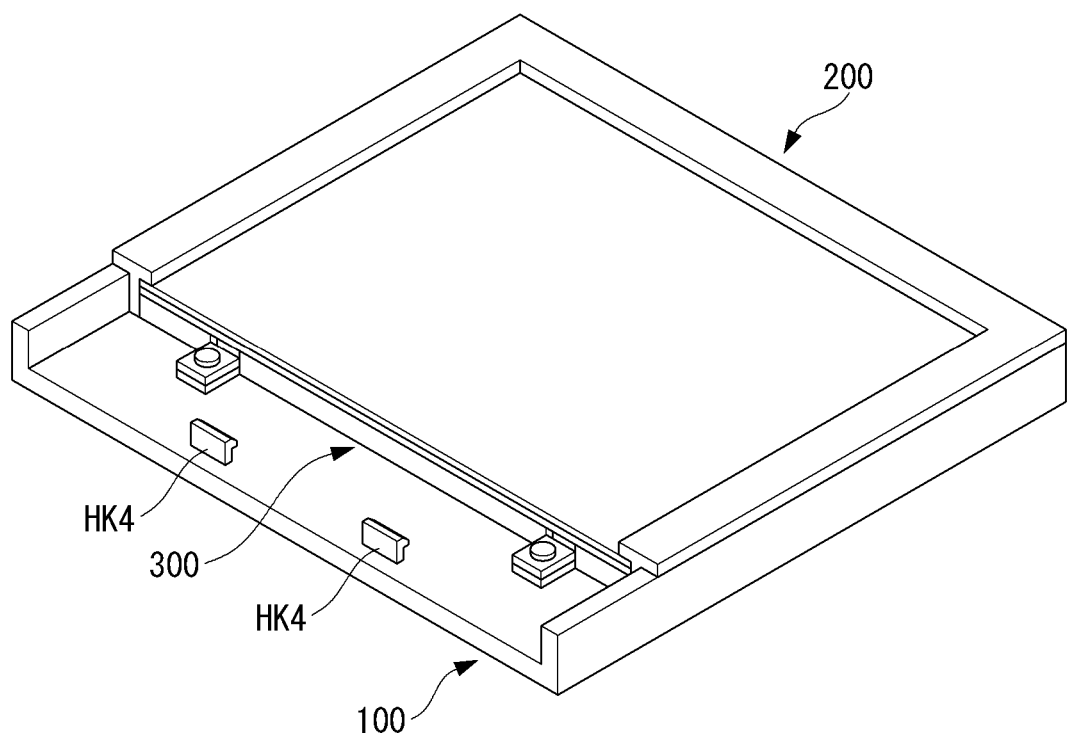

As shown in FIG. 37, the back horizontal part 100H of the back cover 100 may include a fourth hook HK4 corresponding to the third hook HK3.

Figure 38:
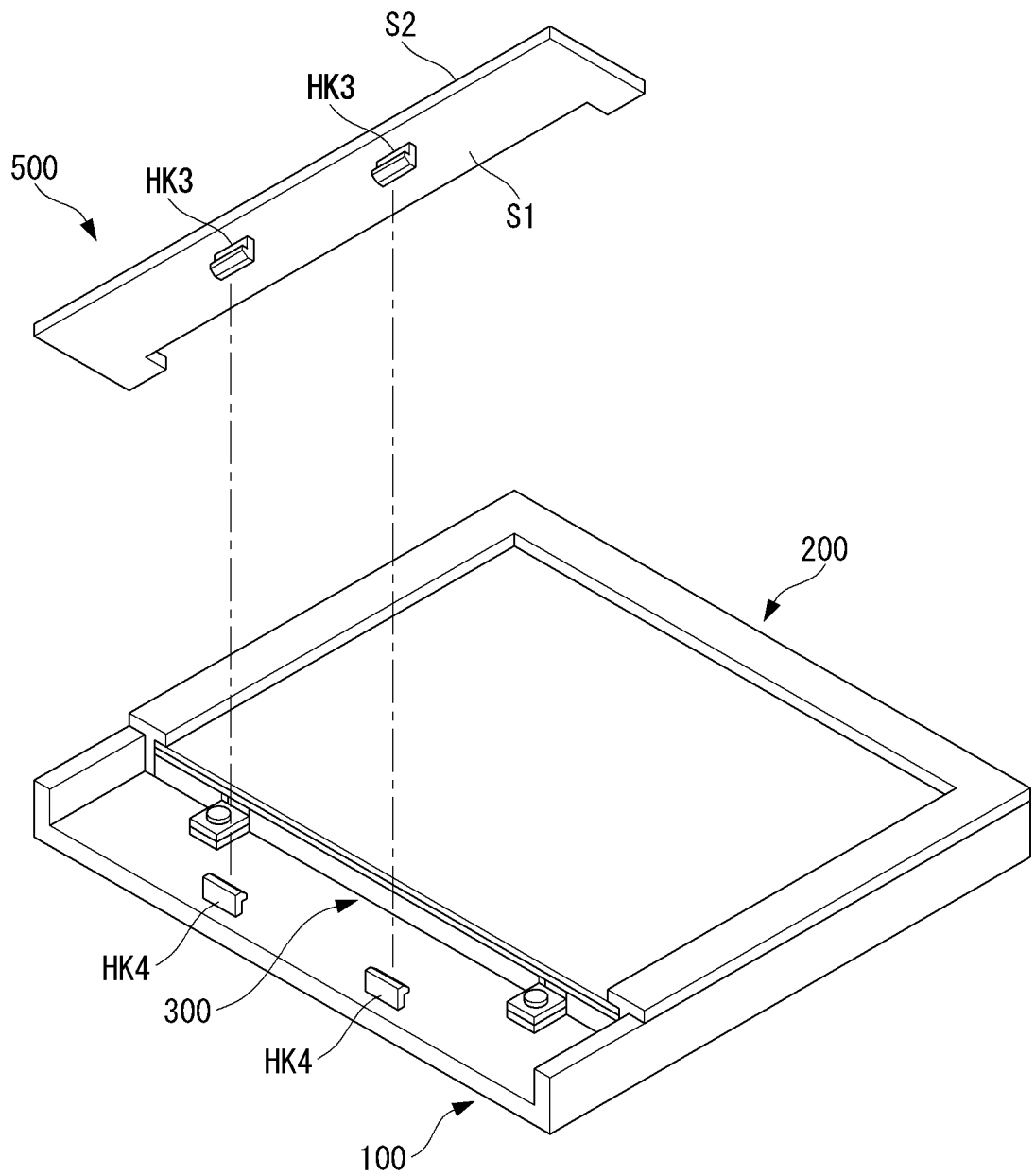
Figure 39:
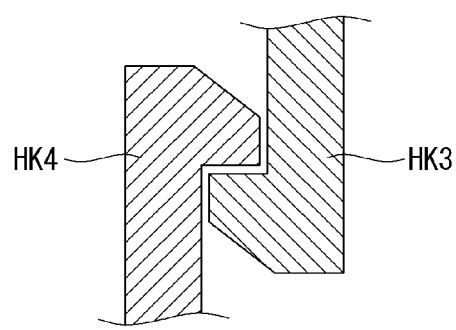

In the above-described configuration, when the bottom cover 500 is disposed on the back cover 100 as shown in FIG. 38, the third hook HK3 of the bottom cover 500 and the fourth hook HK4 of the back cover 100 may be engaged with each other as shown in FIG. 39. Hence, the bottom cover 500 may be connected to the back cover 100.

Figure 40:
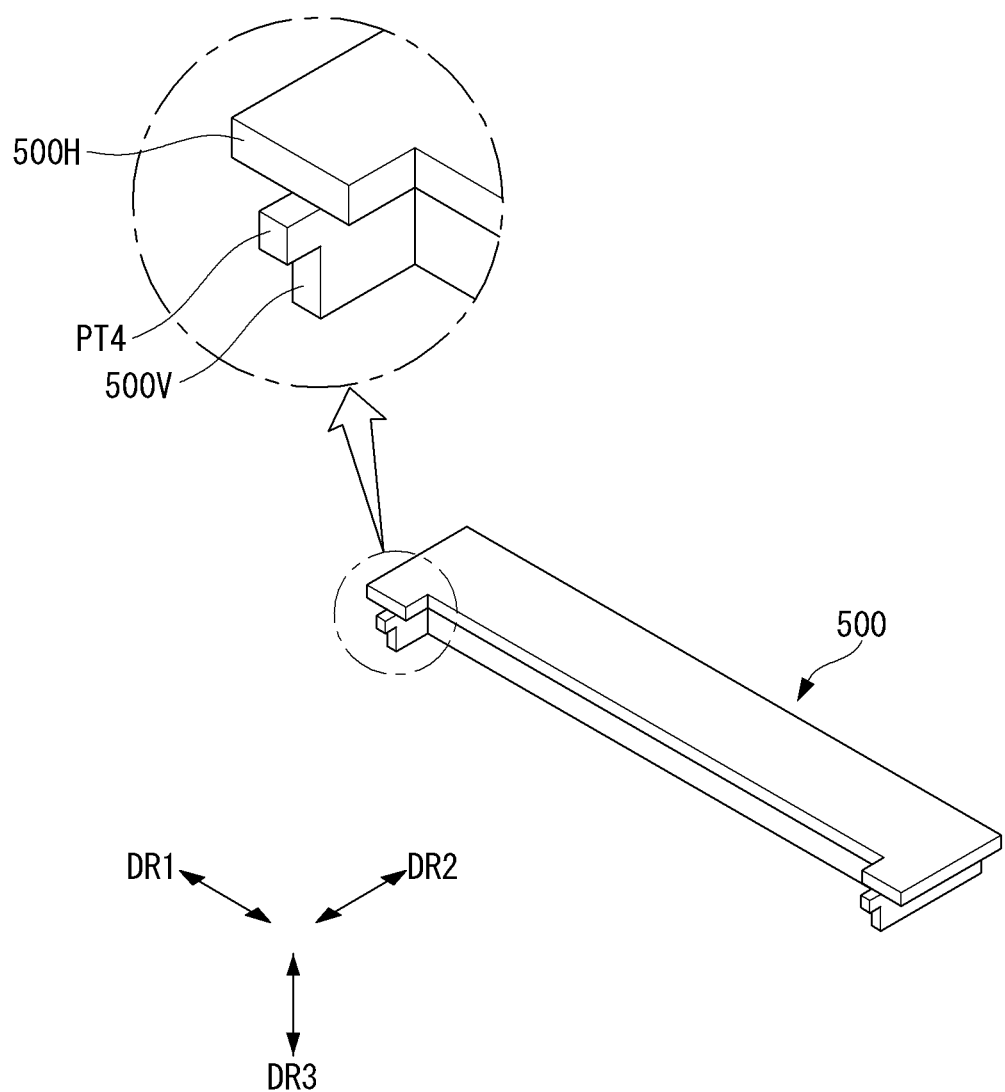

As shown in FIG. 40, protrusions PT4 may be formed at both ends of the bottom cover 500, respectively. The protrusions PT4 formed at both ends of the bottom cover 500 may be called fourth protrusions.

The bottom cover 500 may include a bottom horizontal part 500H extending in the horizontal direction (i.e., the first direction DR1 and/or the second direction DR2) and a bottom vertical part 500V extending from the bottom horizontal part 500H in the vertical direction (i.e., the third direction DR3).

The fourth protrusions PT4 may be formed on the bottom vertical part 500V.

The fourth protrusion PT4 may extend from the bottom vertical part 500V toward the second front cover 200S1 or the third front cover 200S2.

Figure 41:
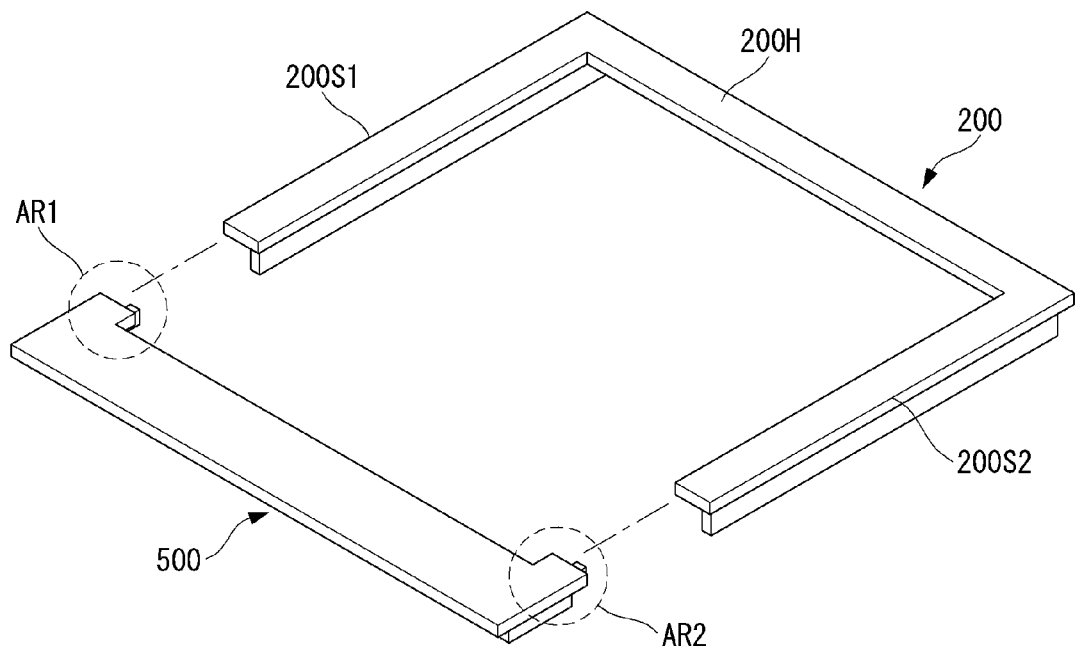

As shown in FIG. 41, the bottom cover 500 may include a first part AR1 corresponding to an end of the second front cover 200S1 and a second part AR2 corresponding to an end of the third front cover 200S2.

The first part AR1 may be opposite to the end of the second front cover 200S1, and the second part AR2 may be opposite to the end of the third front cover 200S2.

Figure 42:
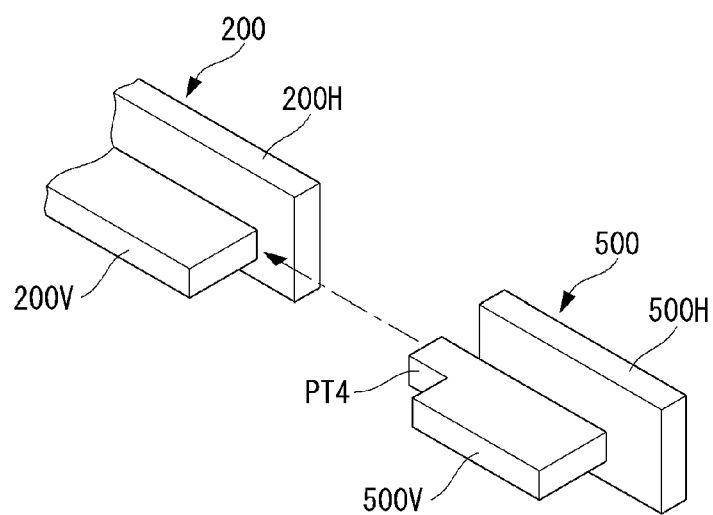

The ends of the bottom cover 500 may correspond to the ends of the front cover 200 in a manner shown in FIG. 42.

As shown in FIG. 42, the fourth protrusion PT4 of the bottom cover 500 may be positioned under the front horizontal part 200H of the front cover 200 and thus may uniformly adjust a height of the bottom horizontal part 500H of the bottom cover 500 and a height of the front horizontal part 200H of the front cover 200.

In other words, the fourth protrusion PT4 formed in the first part AR1 of the bottom cover 500 may be positioned under the front horizontal part 200H of the second front cover 200S1. The fourth protrusion PT4 formed in the second part AR2 of the bottom cover 500 may be positioned under the front horizontal part 200H of the third front cover 200S2.

Figure 43:
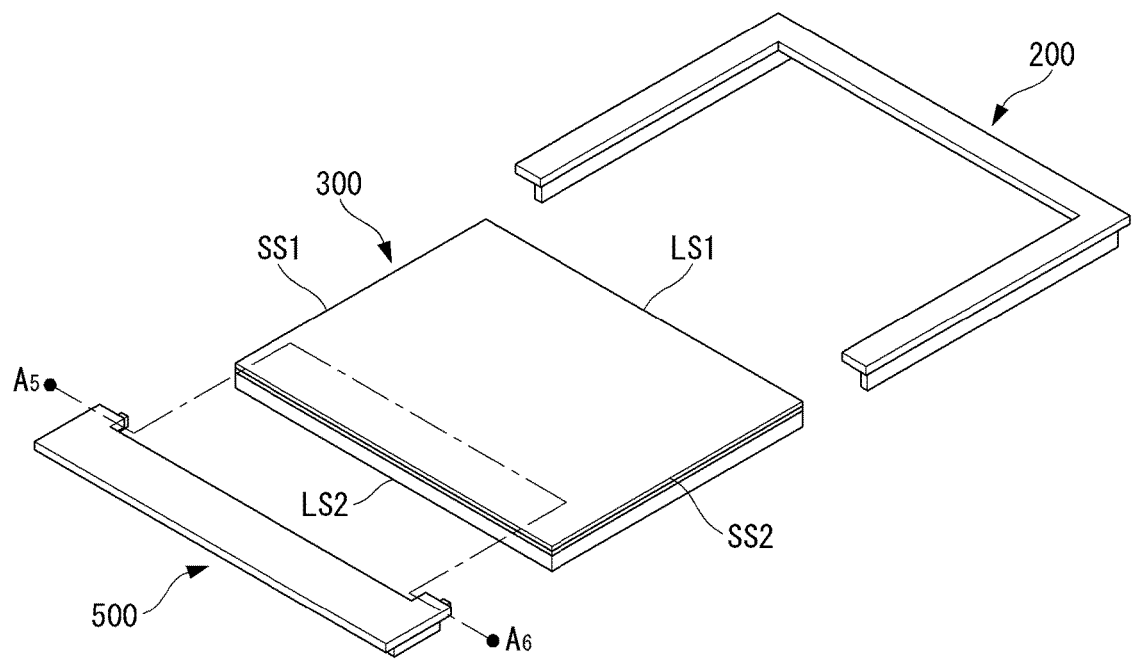

As shown in FIG. 43, the bottom cover 500 and the front cover 200 may be disposed so as to wrap the display module 300.

More specifically, the front cover 200 may correspond to the first long side LS1, a portion of the first short side SS1, and a portion of the second short side SS2 of the display module 300. Further, the bottom cover 500 may correspond to the second long side LS2, a portion of the first short side SS1, and a portion of the second short side SS2 of the display module 300.

Figure 44:
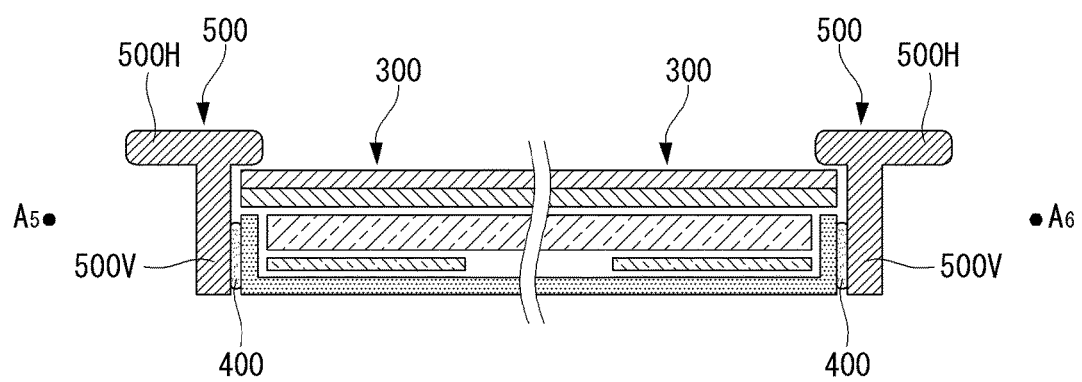

As shown in FIG. 44 showing a cross-sectional view of the display device 11 taken along line A5-A6 of FIG. 43, the bottom horizontal part 500H of the bottom cover 500 may cover an edge of the front surface of the display module 300.

A buffer 400 may be disposed between the bottom vertical part 500V of the bottom cover 500 and the display module 300.

Figure 45:
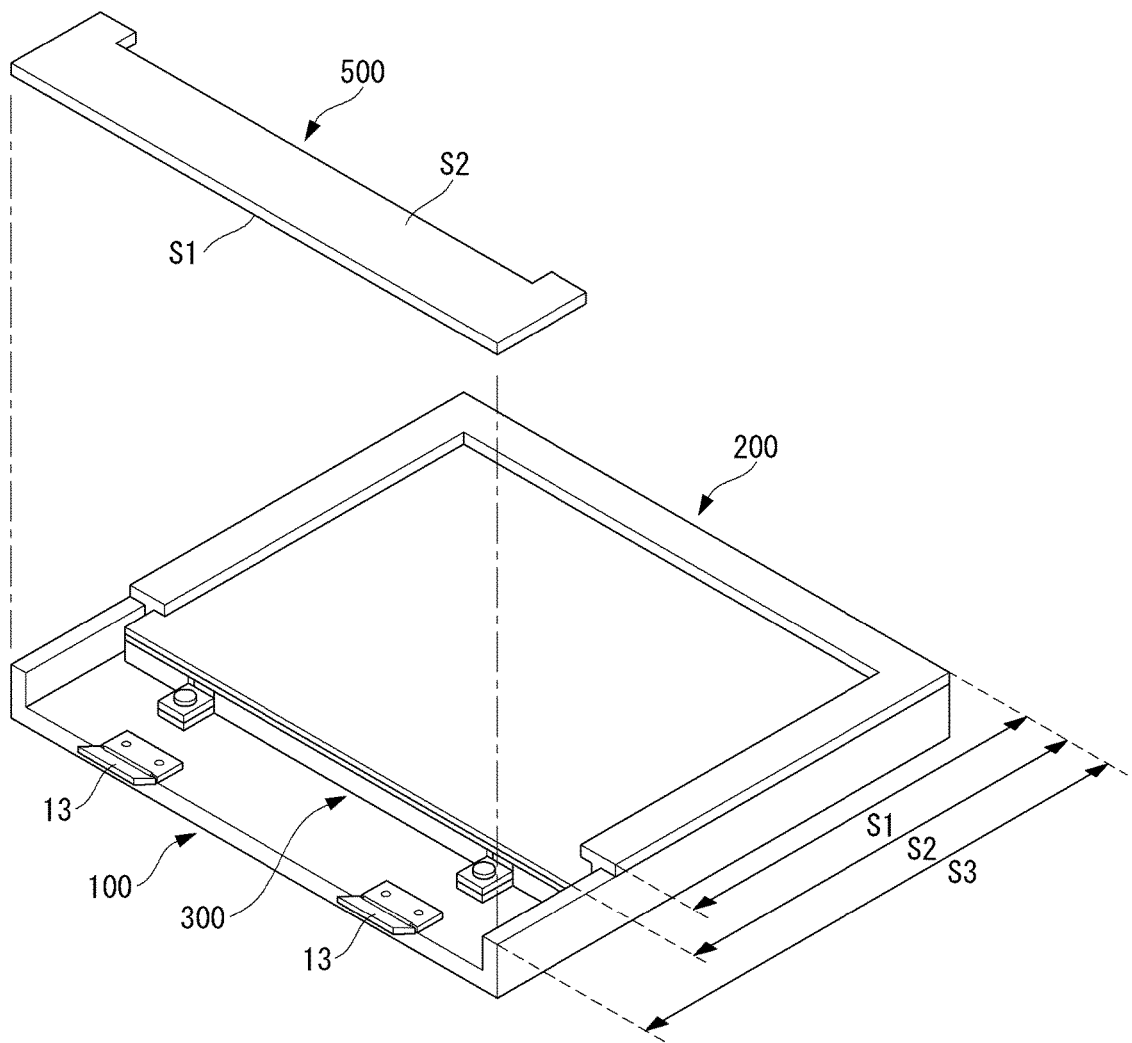

As shown in FIG. 45, because the bottom cover 500 corresponds to the second long side LS2, a portion of the first short side SS1, and a portion of the second short side SS2 of the display module 300, a width S3 of the back cover 100 in the horizontal direction, i.e., the second direction DR2 parallel to the first and second short sides SS1 and SS2 of the display module 300 may be greater than a width S1 of the front cover 200 and a width S2 of the display module 300 in the second direction DR2.

Further, the width S2 of the display module 300 in the second direction DR2 may be greater than the width S1 of the front cover 200 in the second direction DR2.

As described above, when the size of the back cover 100 is sufficiently large, the hinge 13 shown in FIG. 1 may be connected to the back cover 100.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising: a display panel; a front cover including a front horizontal surface, which covers an edge of a front surface of the display panel and extends in a horizontal direction, and a front vertical surface, which extends from the front horizontal surface in a vertical direction and is positioned on a side of the display panel; a frame provided at a rear of the display panel, the frame including an opening; and a back cover including a back horizontal surface, which is positioned at a rear of the frame and extends in the horizontal direction, and a back vertical surface, which extends from the back horizontal surface in the vertical direction, faces an outside of the front vertical surface of the front cover and covered by the front horizontal surface, the front cover further including a protrusion that extends from the front vertical surface of the front cover and inserted into the opening in the frame.

2. The display device of claim 1, wherein the frame includes a horizontal frame surface extending in the horizontal direction and a vertical frame surface extending from the horizontal frame in the vertical direction, and wherein the hole is formed at an intersection of the horizontal frame surface and the vertical frame surface by removing portions of the horizontal frame surface and the vertical frame surface.

3. The display device of claim 1, wherein the protrusion extends from the front vertical surface of the front cover in horizontal direction.

4. The display device of claim 1, wherein the front vertical surface of the front cover overlaps the back vertical surface of the back cover.

5. The display device of claim 1, wherein the display device is included in a first body of laptop computer, and a hinge connects the first body to a second body that includes a user input device.

* * * * *